(12) United States Patent
Wang et al.

(10) Patent No.: US 12,489,706 B2
(45) Date of Patent: Dec. 2, 2025

(54) METHOD FOR GENERATING ENTRY, METHOD FOR SENDING PACKET, AND DEVICE

(71) Applicant: Huawei Technologies Co., Ltd., Shenzhen (CN)

(72) Inventors: Haibo Wang, Beijing (CN); Shunwan Zhuang, Beijing (CN); Gang Yan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 408 days.

(21) Appl. No.: 18/148,549

(22) Filed: Dec. 30, 2022

(65) Prior Publication Data

US 2023/0146104 A1     May 11, 2023

Related U.S. Application Data

(63) Continuation of application No. PCT/CN2021/101684, filed on Jun. 23, 2021.

(30) Foreign Application Priority Data

Jun. 30, 2020   (CN) .......................... 202010616890.4

(51) Int. Cl.
*H04L 45/745*     (2022.01)
*H04L 45/02*      (2022.01)

(52) U.S. Cl.
CPC ............ *H04L 45/745* (2013.01); *H04L 45/02* (2013.01); *H04L 45/04* (2013.01)

(58) Field of Classification Search
CPC ........ H04L 45/745; H04L 45/02; H04L 45/04
(Continued)

(56) References Cited

U.S. PATENT DOCUMENTS 6,055,561 A  *  4/2000  Feldman ............... H04L 49/602
                                                            709/200
10,404,598 B1     9/2019  Sinn
(Continued)

FOREIGN PATENT DOCUMENTS

CN        101588343 A      11/2009
CN        102025702 A      4/2011
(Continued)

OTHER PUBLICATIONS

Pavios Sermpezis et al: "ARTEMIS: Neutralizing BGP Hijacking Within a Minute," IEEE/ACM Transactions on Networking, vol. 26, No. 6, Dec. 1, 2018, XP058427745, 16 pages (pp. 2471-2486).
(Continued)

*Primary Examiner* — Anthony Mejia
(74) *Attorney, Agent, or Firm* — Conley Rose, P.C.

(57) ABSTRACT

A method for generating an entry includes a first network device that receives a first advertisement packet, where the first advertisement packet includes a source autonomous system (AS) identifier, and the source AS identifier corresponds to a source device of the first advertisement packet; and the first network device that generates a forwarding entry based on the source AS identifier, where the forwarding entry includes an identifier of a first egress, and the first network device receives the first advertisement packet through the first egress.

20 Claims, 8 Drawing Sheets

(58) Field of Classification Search
USPC .......................................................... 370/392
See application file for complete search history.

(56) References Cited

U.S. PATENT DOCUMENTS

| | | | |
|---|---|---|---|
| 2005/0213558 A1* | 9/2005 | Levit .................. | H04L 12/4633 |
| | | | 370/254 |
| 2008/0049622 A1* | 2/2008 | Previdi .................. | H04L 45/02 |
| | | | 370/237 |
| 2011/0032868 A1 | 2/2011 | Huang et al. | |
| 2012/0176936 A1 | 7/2012 | Wu et al. | |
| 2013/0311160 A1* | 11/2013 | Cowie .................. | H04W 40/20 |
| | | | 703/13 |
| 2014/0269699 A1 | 9/2014 | Filsfils et al. | |
| 2015/0169351 A1 | 6/2015 | Song | |
| 2016/0044054 A1 | 2/2016 | Stiansen et al. | |
| 2016/0380910 A1* | 12/2016 | Luo ...................... | H04L 47/125 |
| | | | 370/235 |
| 2017/0012876 A1 | 1/2017 | Bamford | |
| 2018/0351857 A1 | 12/2018 | Vairavakkalai et al. | |
| 2019/0068544 A1 | 2/2019 | Hao et al. | |
| 2019/0132281 A1* | 5/2019 | Sawyer ................ | H04L 47/122 |
| 2019/0297016 A1 | 9/2019 | Huang et al. | |
| 2019/0349295 A1 | 11/2019 | Huang et al. | |
| 2019/0372886 A1* | 12/2019 | Beck .................. | H04L 63/1441 |
| 2020/0014557 A1 | 1/2020 | Wang et al. | |
| 2020/0014623 A1 | 1/2020 | Wang et al. | |
| 2020/0099775 A1 | 3/2020 | Brissette et al. | |
| 2020/0228356 A1 | 7/2020 | Meng et al. | |
| 2020/0366763 A1* | 11/2020 | Bonica .................. | H04L 45/34 |
| 2021/0021517 A1* | 1/2021 | Sellappa ............... | H04L 61/251 |
| 2021/0067377 A1* | 3/2021 | Beck ...................... | H04L 9/14 |
| 2021/0084009 A1 | 3/2021 | Du et al. | |
| 2021/0184974 A1 | 6/2021 | Wu et al. | |
| 2021/0203695 A1 | 7/2021 | Li | |
| 2021/0336849 A1* | 10/2021 | Boucadair .............. | H04L 45/42 |
| 2022/0131785 A1* | 4/2022 | Mereddy ................ | H04L 41/12 |
| 2022/0247673 A1* | 8/2022 | Barth .................... | H04L 45/50 |
| 2022/0247750 A1* | 8/2022 | Kaidi .................. | G06F 11/3006 |
| 2023/0155932 A1 | 5/2023 | Zhang et al. | |

FOREIGN PATENT DOCUMENTS

| | | | | |
|---|---|---|---|---|
| CN | 103227757 | A | 7/2013 | |
| CN | 104253757 | A | 12/2014 | |
| CN | 104579973 | A | 4/2015 | |
| CN | 104811377 | A | 7/2015 | |
| CN | 105337865 | A | 2/2016 | |
| CN | 106850430 | A | 6/2017 | |
| CN | 107404436 | A | 11/2017 | |
| CN | 107682261 | A | 2/2018 | |
| CN | 108075956 | A | 5/2018 | |
| CN | 108124285 | A | 6/2018 | |
| CN | 108306825 | A | 7/2018 | |
| CN | 108574630 | A | 9/2018 | |
| CN | 108768856 | A | 11/2018 | |
| CN | 108777654 | A | 11/2018 | |
| CN | 109151086 | A | 1/2019 | |
| CN | 109561022 | A | 4/2019 | |
| CN | 109787877 | A | 5/2019 | |
| CN | 110213161 | A | 9/2019 | |
| CN | 110535766 | A | 12/2019 | |
| CN | 110661711 | A | 1/2020 | |
| CN | 110808913 | A | 2/2020 | |
| CN | 110912853 | A | 3/2020 | |
| CN | 111510378 | A | 8/2020 | |
| EP | 3817306 | A1 * | 5/2021 | ............. H04L 45/02 |
| EP | 4156564 | A1 * | 3/2023 | ........... H04L 45/745 |
| WO | 2013165879 | A1 | 11/2013 | |
| WO | 2017107814 | A1 | 6/2017 | |

OTHER PUBLICATIONS

Kotikalapudi Sriram et al: Resilient Interdomain Traffic Exchange: BGP security and DDos mitigation, NIST SP 800-189, National Institute of Standards and Technology (NIST), Dec. 17, 2019, XP061057762, 81 pages.

Pankaj Kumar Dalela et al, C4.5 Decision Tree Machine Learning Algorithm Based GIS Route Identification, Tenth International Conference on Ubiquitous and Future Networks (ICUFN), 2018, 6 pages.

Lu Gao-Feng et al, Enhancing the Ability of Inter-Domain IP Spoofing Prevention, ISSN 1000-9825, CODEN RUXUEW, Journal of Software, vol. 21, No. 7, Jul. 2010, with an English Abstract, 13 pages.

Deng Wen-ping et al, Research on the Structure and Connectivity of the Internet AS-Level Topology, Computer Engineering and Science, vol. 34, No. 6, 2012, with an English Abstract, 6 pages.

Srihari Nelakuditi et al, Mitigating transient loops through interface-specific forwarding, Computer Networks 52, 2008, 17 pages.

* cited by examiner

```
+-------------------------------+
|           Length              |
+-------------------------------+
|           Prefix              |
+-------------------------------+
```

FIG. 4

| Destination AS identifier | Egress identifier |
|---|---|
| AS 2 | A |
| AS 3 | B |

FIG. 5

| Destination AS identifier | Egress | Next-hop device |
|---|---|---|
| AS 2 | A | Network device 222 |
| AS 3 | B | Network device 224 |

FIG. 6

| Destination AS identifier | Egress | Identifier of a destination device |
|---|---|---|
| AS 2 | C | Router 222 |

FIG. 7

| Destination AS identifier | Egress | Next-hop AS identifier | AS path |
|---|---|---|---|
| AS 1 | D | AS 1 | AS 1 |
| AS 2 | D | AS 1 | AS 1, AS 2 |
FIG. 8
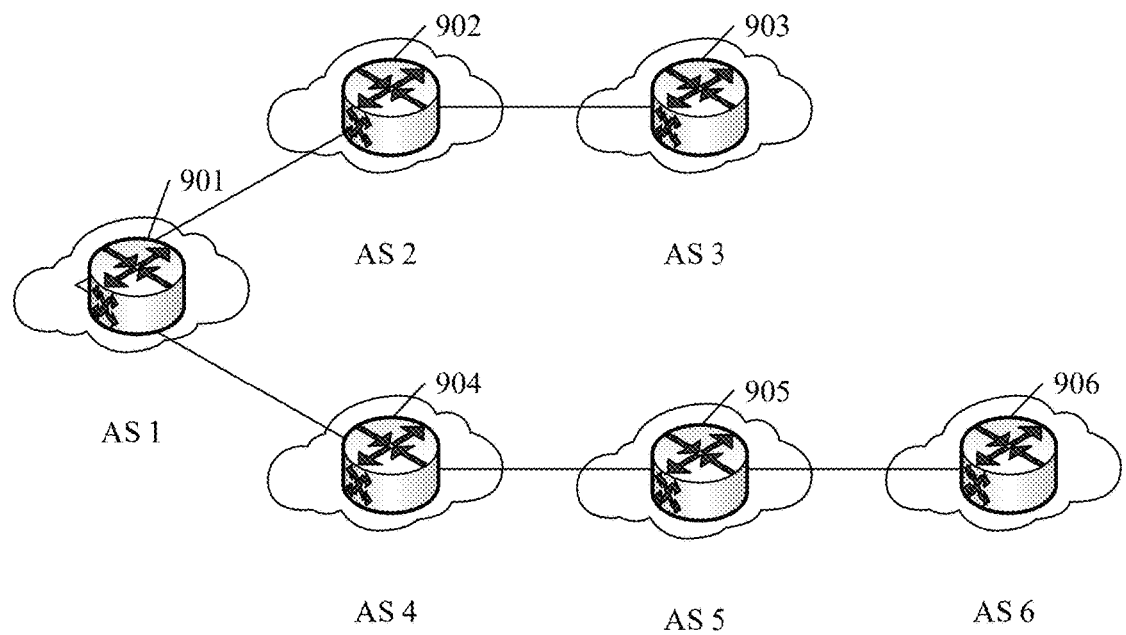
FIG. 9
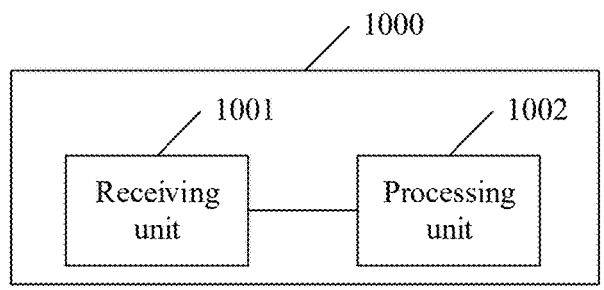
FIG. 10

METHOD FOR GENERATING ENTRY, METHOD FOR SENDING PACKET, AND DEVICE

CROSS-REFERENCE TO RELATED APPLICATIONS

This application is a continuation application of International Patent Application No. PCT/CN2021/101684 filed on Jun. 23, 2021, which claims priority to Chinese Patent Application No. 202010616890.4 filed on Jun. 30, 2020. The disclosures of the aforementioned applications are hereby incorporated by reference in their entireties.

TECHNICAL FIELD

This application relates to the communications field, and in particular, to a method for generating an entry, a method for sending a packet, and a device.

BACKGROUND

The Border Gateway Protocol (BGP) is a widely used network protocol. A BGP network architecture may include a plurality of network devices. A network device may send, to another network device, an advertisement packet including an Internet Protocol (IP) address, to notify the other network device of an IP address of the network device or a network device connected to the network device.

After receiving the advertisement packet, the network device may generate a forwarding entry based on the advertisement packet. The forwarding entry may include the IP address included in the advertisement packet and a network interface for receiving the advertisement packet. When receiving a packet whose destination address is the IP address, the network device may search the forwarding entry for the network interface corresponding to the IP address, and send the packet through the network interface. In this way, the packet may be sent from a network device to any one or more network devices in the network architecture.

However, in the conventional BGP network architecture, a quantity of forwarding entries depends on a quantity of network devices in the network architecture and a quantity of terminals connected to the network devices. As the quantity of network devices and the quantity of connected terminals increase greatly, the quantity of forwarding entries of the network device also increases greatly. This imposes a high requirement on a processing capability of the network device, and also brings a great maintenance pressure to a network operator corresponding to the network device.

SUMMARY

Embodiments of this application provide a method for generating an entry, a method for sending a packet, and a device, to reduce a requirement on a processing capability of a network device, so as to reduce a maintenance pressure on an operator.

According to a first aspect, an embodiment of this application provides a method for generating an entry. The method may be applied to a first network device, for example, a router or a switch. The method includes the following steps. First, the first network device receives a first advertisement packet. The first network device may receive the first advertisement packet through a first egress. The first advertisement packet may include a source autonomous system (AS) identifier. The source AS identifier is an AS identifier corresponding to a source device of the first advertisement packet, namely, an AS identifier corresponding to a network device that generates the first advertisement packet. After obtaining the first advertisement packet, the first network device may generate a forwarding entry based on the source AS identifier. The forwarding entry may include the source AS identifier and an identifier of the first egress. In this way, the forwarding entry records a correspondence between the first egress through which the first network device receives the first advertisement packet and the source AS identifier in the first advertisement packet. It indicates that the first network device may send, through the first egress, a packet to a network device or downstream device located in a source AS. In this case, a quantity of forwarding entries may be close to a quantity of ASs in a network architecture. In addition, one AS may include a plurality of network devices and a plurality of downstream devices, and the quantity of ASs in the network architecture is far less than a sum of a quantity of network devices and a quantity of downstream devices. Therefore, the quantity of forwarding entries is far less than the sum of the quantity of network devices and the quantity of downstream devices. Compared with a conventional technology, an amount of information recorded in the forwarding entry of the first network device is greatly reduced, thereby reducing a requirement on a processing capability of the first network device, and reducing a maintenance pressure on a network operator. In addition, because a plurality of network devices in a same AS correspond to a same AS identifier, only a small part of the network devices in each AS can send an advertisement packet to the outside, so that the requirement on the processing capability of the network device is further reduced.

Optionally, when the source AS identifier is the same as an AS identifier corresponding to the first network device, the first advertisement packet may further include an identifier of the source device, indicating information about the source device in the network architecture. When generating the forwarding entry, the first network device may generate the forwarding entry based on the source AS identifier and the identifier of the source device. In this case, the forwarding entry may include the source AS identifier, the identifier of the source device, and the identifier of the first egress. In this way, when the first network device receives a data packet whose destination AS identifier is the same as the AS identifier corresponding to the first network device, the first network device may determine the first egress based on the identifier of the source device, to send the data packet to a destination device through the first egress.

Optionally, the first advertisement packet may further include an AS identifier set. After receiving the first advertisement packet, the network device may add the AS identifier corresponding to the network device to the AS identifier set. In this case, the AS identifier set includes an AS identifier of at least one AS that the first advertisement packet passes through, in other words, at least one AS identifier corresponding to an AS path from the source device to the first network device, namely, an AS path that the first advertisement packet passes through.

Optionally, the AS identifier set may include at least two AS identifiers. Therefore, to improve network security, the first network device may verify the first advertisement packet before generating the forwarding entry. The first network device may prestore a neighbor relationship between ASs in the network architecture. After receiving the first advertisement packet, the first network device may obtain the at least two AS identifiers in the AS identifier set in the first advertisement packet, and determine whether a neighbor relationship between any two adjacent AS identifiers in the AS identifiers is correct. In other words, it is determined whether any two ASs on the AS path for transmitting the first advertisement packet are in a neighbor relationship. If the neighbor relationship between the AS identifiers is correct, the first network device may continue subsequent processing. If the neighbor relationship between the AS identifiers is abnormal, it indicates that the first advertisement packet is attacked, and the first network device may discard the first advertisement packet. In this way, a path hijacking attack can be prevented.

Optionally, to diffuse the source AS identifier in the first advertisement packet to a network device in another AS in the network architecture, the first network device may add the AS identifier corresponding to the first network device to the AS identifier set in the first advertisement packet, to obtain a second advertisement packet. The first network device may send the second advertisement packet to a second network device. An AS corresponding to the second network device and an AS corresponding to the first network device are neighboring ASs, and the AS corresponding to the second network device is not on the AS path of the first advertisement packet. In this way, the first network device may send, by using the second advertisement packet, the source AS identifier to another AS outside the AS path of the first advertisement packet, to diffuse the source AS identifier to the other AS.

Optionally, to defend against a source hijacking attack, the first network device may further verify a $1^{st}$ AS identifier in the AS identifier set. The first network device may determine, through comparison, whether a $1^{st}$ AS identifier in the AS identifier set is the same as the source AS identifier. When generating the advertisement packet, the source device may add an AS identifier corresponding to the source device to the AS identifier set. Therefore, the $1^{st}$ AS identifier in the AS identifier set is the source AS identifier. If the $1^{st}$ AS identifier in the AS identifier set is the same as the source AS identifier, the first network device may continue to perform subsequent steps. If the $1^{st}$ AS identifier in the AS identifier set is different from the source AS identifier, it indicates that the first advertisement packet is attacked, and the first network device may discard the first advertisement packet. In this way, the source hijacking attack can be prevented.

Optionally, the first network device may further receive a third advertisement packet. The third advertisement packet may include a route prefix address, and the route prefix address may include the source AS identifier. To defend against a long mask attack, the first network device may determine, through comparison, whether a mask length corresponding to the route prefix address in the third advertisement packet is greater than a mask length corresponding to the source AS identifier. If the mask length corresponding to the route prefix address is greater than the mask length corresponding to the source AS identifier, it indicates that the first network device encounters a long mask hijacking attack, and the first network device may discard the third advertisement packet. In this way, the long mask hijacking attack can be prevented.

Optionally, to advertise the AS identifier corresponding to the first network device to another network device, the first network device may further send a fourth advertisement packet to a third network device. The third network device may be any other network device different from the first network device, and the fourth advertisement packet may include the AS identifier corresponding to the first network device.

Optionally, the first advertisement packet received by the first network device may be a BGP update message.

Optionally, when the first advertisement packet is the BGP update message, the source AS identifier in the first advertisement packet may be carried in a route prefix field of the BGP update message.

Optionally, the first advertisement packet may include an IP version 6 (IPv6) address. The IPV6 address may include indication information and the source AS identifier. The indication information indicates that the IPV6 address further includes the source AS identifier. In this way, after obtaining the IPV6 address, the first network device may determine, based on the indication information, that the IPV6 address further includes the source AS identifier, to determine the source AS identifier based on the IPV6 address, so as to generate the forwarding entry.

According to a second aspect, an embodiment of this application further provides a method for sending a packet. The method may be applied to a first network device, and the first network device may be a network device such as a router or a switch. The method includes the following steps. First, the first network device obtains a first packet. The first packet may be generated by a downstream device of the first network device and sent to the first network device, or may be sent by another network device. A destination address of the first packet may include a destination AS identifier, namely, an AS identifier corresponding to a destination device of the first packet. After obtaining the first packet, the first network device may determine a first egress based on the destination AS identifier, and send the first packet to the destination device through the first egress. In this way, the first network device may determine the first egress based on the destination AS identifier, to send, through the first egress, the first packet to the destination device to which the first packet is sent, so that normal packet transmission is implemented.

Optionally, when the destination AS identifier of the first packet is different from an AS identifier corresponding to the first network device, the first network device may determine the first egress based on a forwarding entry. The forwarding entry may include a correspondence between the destination AS identifier and an identifier of the first egress. In this way, when the destination device of the first packet and the first network device belong to different ASs, the first network device may search the forwarding entry for the first egress corresponding to the destination AS identifier, to send, through the first egress, the first packet to an AS in which the destination device is located, in other words, send the first packet to the destination device through the first egress, so that normal packet transmission is implemented.

Optionally, the first network device may generate the forwarding entry by using a first advertisement packet. The first network device may receive, through the first egress, the first advertisement packet that includes the destination AS identifier. When the destination AS identifier included in the first advertisement packet is different from the AS identifier corresponding to the first network device, the first network device may generate the forwarding entry based on the destination AS identifier and the identifier of the first egress, in other words, record the correspondence between the destination AS identifier and the identifier of the first egress. In this way, the first network device may send, through the first egress based on the forwarding entry, a data packet in which a destination AS is an AS corresponding to the destination AS identifier. In this case, when the first network device receives the first packet whose destination address includes the destination AS identifier, the first network device may search the forwarding entry for the first egress corresponding to the destination AS identifier, to send the first packet to the destination device through the first egress.

Optionally, the destination address of the first packet may further include an identifier of the destination device. When the destination AS identifier of the first packet is the same as an AS identifier corresponding to the first network device, the first network device may search a forwarding entry for the first egress corresponding to the identifier of the destination device. The forwarding entry may include the identifier of the destination device and an identifier of the first egress. In this way, when the destination device of the first packet and the first network device belong to a same AS, the first network device may determine the first egress based on the identifier of the destination device, to send the first packet to the destination device in the AS, so that normal packet transmission is implemented.

Optionally, the forwarding entry may include a first route prefix address, and the first route prefix address may include the destination AS identifier.

According to a third aspect, an embodiment of this application provides an apparatus for generating an entry. The apparatus is used in a first network device, and includes a receiving unit configured to receive a first advertisement packet, where the first advertisement packet includes a source autonomous system AS identifier, and the source AS identifier is an AS identifier corresponding to a source device of the first advertisement packet, and a processing unit configured to generate a forwarding entry based on the source AS identifier, where the forwarding entry includes the source AS identifier and an identifier of a first egress, and the first network device receives the first advertisement packet through the first egress.

Optionally, the first advertisement packet further includes an identifier of the source device. The processing unit is configured to generate the forwarding entry based on the source AS identifier and the identifier of the source device. The forwarding entry includes the source AS identifier, the identifier of the source device, and the identifier of the first egress.

Optionally, the first advertisement packet further includes an AS identifier set, and the AS identifier set includes at least one AS identifier corresponding to an AS path from the source device to the first network device.

Optionally, the at least one AS identifier includes at least two AS identifiers. The processing unit is further configured to determine that a neighbor relationship between two adjacent AS identifiers in the at least two AS identifiers is correct.

Optionally, the processing unit is further configured to send a second advertisement packet to a second network device. The second advertisement packet includes an AS identifier corresponding to the first network device and the AS identifier set. An AS corresponding to the second network device and an AS corresponding to the first network device are neighboring ASs. The AS corresponding to the second network device is not on the AS path.

Optionally, the processing unit is further configured to determine that a $1^{st}$ AS identifier in the AS identifier set is the same as the source AS identifier. The $1^{st}$ AS identifier is for identifying an AS corresponding to the source device on the AS path.

Optionally, the receiving unit is further configured to receive a third advertisement packet. The third advertisement packet includes a route prefix address, and the route prefix address includes the source AS identifier. The processing unit is further configured to discard the third advertisement packet in response to that a mask length corresponding to the route prefix address is greater than a mask length corresponding to the source AS identifier.

Optionally, the processing unit is further configured to send a fourth advertisement packet to a third network device. The fourth advertisement packet includes the AS identifier corresponding to the first network device.

Optionally, the first advertisement packet is a BGP update message.

Optionally, the source AS identifier in the first advertisement packet is carried in a route prefix field of the BGP update message.

Optionally, the first advertisement packet includes an IPV6 address. The IPV6 address includes indication information and the source AS identifier, and the indication information indicates that the IPV6 address further includes the source AS identifier.

According to a fourth aspect, an embodiment of this application further provides an apparatus for sending a packet. The apparatus is used in a first network device, and includes a receiving unit configured to obtain a first packet, where a destination address of the first packet includes a destination autonomous system AS identifier, and the destination AS identifier is an AS identifier corresponding to a destination device of the first packet, a processing unit configured to determine a first egress based on the destination AS identifier, and a sending unit configured to send the first packet to the destination device through the first egress.

The processing unit is configured to determine the first egress based on a forwarding entry in response to that the destination AS identifier is different from an AS identifier corresponding to the first network device. The forwarding entry includes the destination AS identifier and an identifier of the first egress.

Optionally, the receiving unit is further configured to receive a first advertisement packet. The first advertisement packet includes the destination AS identifier. The processing unit is further configured to generate the forwarding entry based on the destination AS identifier and the identifier of the first egress in response to that the destination AS identifier is different from the AS identifier corresponding to the first network device. The first network device receives the first advertisement packet through the first egress.

Optionally, the destination address further includes an identifier of the destination device. The processing unit is further configured to, in response to that the destination AS identifier is the same as an AS identifier corresponding to the first network device, determine, based on a forwarding entry, the first egress corresponding to the identifier of the destination device. The forwarding entry includes the identifier of the destination device and an identifier of the first egress.

Optionally, the forwarding entry includes a first route prefix address, and the first route prefix address includes the destination AS identifier.

According to a fifth aspect, an embodiment of this application provides a method for sending a packet. The method is applied to a second network device, and includes generating a first advertisement packet, where the first advertisement packet includes a source autonomous system AS identifier, and the source AS identifier is an AS identifier corresponding to an apparatus that generates an entry, and sending the first advertisement packet to a first network device.

According to a sixth aspect, an embodiment of this application provides a packet sending apparatus for generating an entry. The apparatus is used in a second network device, and includes a generating unit configured to generate a first advertisement packet, where the first advertisement packet includes a source autonomous system AS identifier, and the source AS identifier is an AS identifier corresponding to the apparatus, and a sending unit configured to send the first advertisement packet to a first network device.

According to a seventh aspect, an embodiment of this application provides a network system, including a first network device. The first network device may be used in the method according to either of the first aspect or the second aspect.

Optionally, the network system further includes a second network device, and the second network device is for the method according to the fifth aspect.

According to an eighth aspect, an embodiment of this application further provides a network device. The network device includes at least one processor, where the at least one processor is coupled to at least one memory, and is configured to execute a computer program or instructions stored in the at least one memory, to enable the network device to perform the method for generating an entry according to the first aspect.

According to a ninth aspect, an embodiment of this application further provides a network device. The first device includes at least one processor, where the at least one processor is coupled to at least one memory, and is configured to execute a computer program or instructions stored in the at least one memory, to enable the first device to perform the method for sending a packet according to the second aspect.

According to a tenth aspect, an embodiment of this application further provides a network device. The first device includes at least one processor, where the at least one processor is coupled to at least one memory, and is configured to execute a computer program or instructions stored in the at least one memory, to enable the first device to perform the method for sending a packet according to the fifth aspect.

According to an eleventh aspect, an embodiment of this application provides a computer-readable storage medium, including a computer program. When the computer program is run on a computer, the computer is enabled to perform the method according to any one of the first aspect, the second aspect, or the fifth aspect.

According to a twelfth aspect, an embodiment of this application provides a chip, including a processor and an interface circuit. The interface circuit is configured to receive instructions and transmit the instructions to the processor, and the processor is configured to perform the method according to any one of the first aspect, the second aspect, or the fifth aspect.

BRIEF DESCRIPTION OF DRAWINGS

FIG. 4 is a schematic diagram of a possible format of a network layer reachability information (NLRI) field according to an embodiment of this application;

FIG. 5 is a schematic diagram of a possible format of a forwarding entry according to an embodiment of this application;

FIG. 6 is a schematic diagram of a possible format of a forwarding entry according to an embodiment of this application;

FIG. 7 is a schematic diagram of a possible format of a forwarding entry according to an embodiment of this application;

FIG. 8 is a schematic diagram of a possible format of a forwarding entry according to an embodiment of this application;

FIG. 9 is a schematic diagram of a structure of a network architecture according to an embodiment of this application;

FIG. 10 is a schematic diagram of a structure of an entry generating apparatus according to an embodiment of this application;

DESCRIPTION OF EMBODIMENTS

In the Internet, there may be a plurality of ASs, and one AS may include a plurality of network devices. The network devices in the AS can arbitrarily establish connections and transmit packets to each other. In addition, some network devices in one AS may be further connected to one or more network devices in another AS, to implement inter-AS packet transmission. In a packet transmission process, the network device may determine, based on a forwarding entry, a network interface corresponding to a destination IP address, and forward a packet to another network device in another AS through the network interface.

Figure 1:
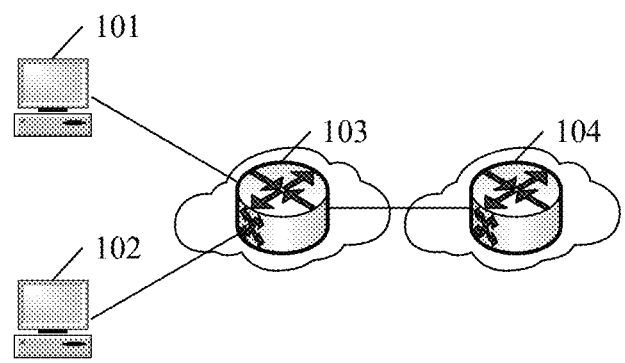
FIG. 1 is a schematic diagram of a conventional architecture of a BGP network according to an embodiment of this application.

FIG. 1 is a schematic diagram of a structure of a conventional architecture of a BGP network. The BGP network may include a terminal device 101, a terminal device 102, a network device 103, and a network device 104. The terminal device 101 and the terminal device 102 each may be a downstream device of the network device 103, and the network device 103 is connected to the network device 104. In this embodiment of this application, the network device 103 belongs to an AS 1, and the network device 104 belongs to an AS 2.

To implement packet forwarding, the network device 103 in the AS 1 may publish an advertisement packet 1 to the network device 104. The advertisement packet 1 may include an IP address of the terminal device 101, and is for advertising the IP address of the terminal device 101 to the network device 104. The network device 103 may further publish an advertisement packet 2 and an advertisement packet 3 to the network device 104. The advertisement packet 2 includes an IP address of the terminal device 102, and the advertisement packet 3 includes an IP address of the network device 103. The network device 104 may generate corresponding forwarding entries based on the received advertisement packet 1, advertisement packet 2, and advertisement packet 3. It can be learned that the network device 104 needs to generate three forwarding entries for the AS 1, to implement an objective of forwarding a data packet to a network device in the AS 1.

It can be learned that, to implement inter-AS packet transmission, a quantity of forwarding entries of the network device is close to or greater than a sum of a quantity of network devices and a quantity of terminal devices. However, with expansion of a scale of the Internet, the quantity of network devices and the quantity of terminal devices are increasing, and the network device need to generate a large quantity of forwarding entries. This imposes a high requirement on a processing capability of the network device, and also brings a great maintenance pressure to an Internet operator.

To resolve the foregoing problem, an embodiment of this application provides a route advertisement method. A quantity of forwarding entries is reduced based on a domain routing manner, thereby reducing a requirement on a processing capability of a network device, so that a maintenance pressure on an Internet operator is reduced.

Figure 2:
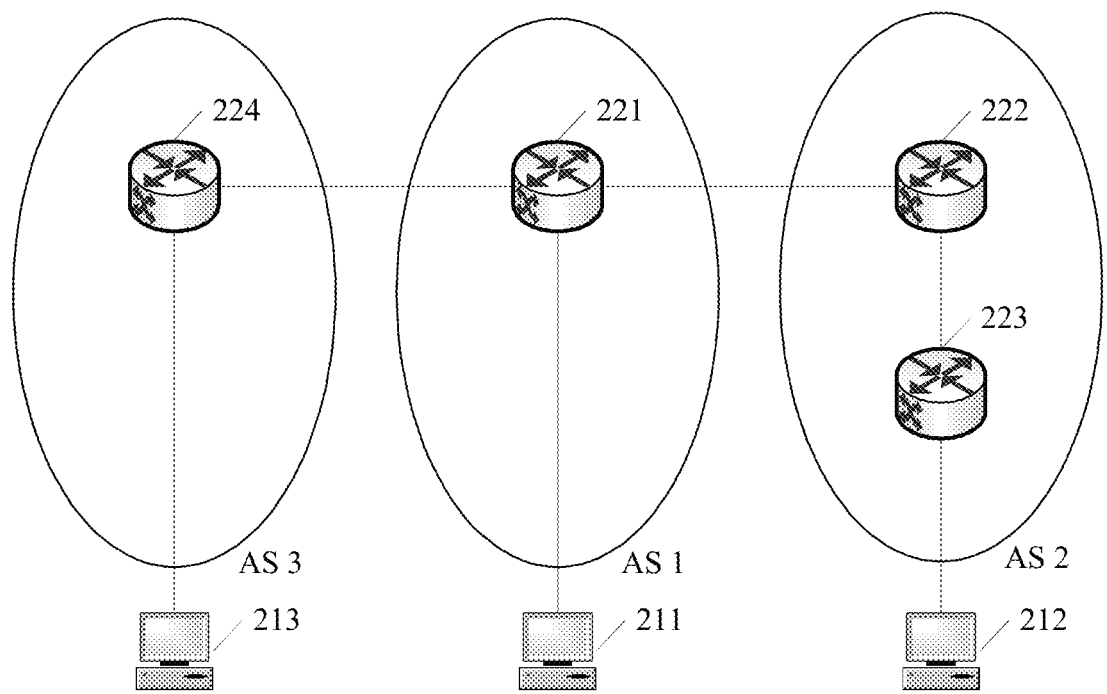
FIG. 2 is a schematic diagram of an architecture of a system according to an embodiment of this application.

For case of understanding, an application scenario in embodiments of this application is first described. FIG. 2 is a schematic diagram of an architecture of a system 200 according to an embodiment of this application.

The system 200 may include a device 211, a device 212, a device 213, a network device 221, a network device 222, a network device 223, and a network device 224. The network device 221 belongs to an AS 1, the network device 222 and the network device 223 belong to an AS 2, and the network device 224 belongs to an AS 3. The network device 221 may be connected to the network device 222 and the network device 224, and the network device 222 may be connected to the network device 223. The device 211 may be connected to the network device 221, the device 212 may be connected to the network device 223, and the device 213 may be connected to the network device 224.

The device 211, the device 212, and the device 213 may be terminal devices or servers. The terminal device may also be referred to as a user equipment (UE), a mobile station (MS), a mobile terminal (MT), a terminal, or the like, and is a device that provides voice and/or data connectivity for a user, or a chip disposed in the device, for example, a handheld device or a vehicle-mounted device having a wireless connection function. Currently, some examples of the terminal device are a mobile phone, a desktop computer, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, a fifth generation (5G)-residential gateway (5G-RG) device, and the like.

The network device 221, the network device 222, the network device 223, and the network device 224 each may be an entity device such as a router or a switch, or may be a server on which a virtual router or a virtual switch is deployed, and is configured to transmit a message among the device 211, the device 212, and the device 213. The AS 211, the AS 212, and the AS 213 may belong to different Internet service providers, or may belong to a same Internet service provider.

Figure 3:
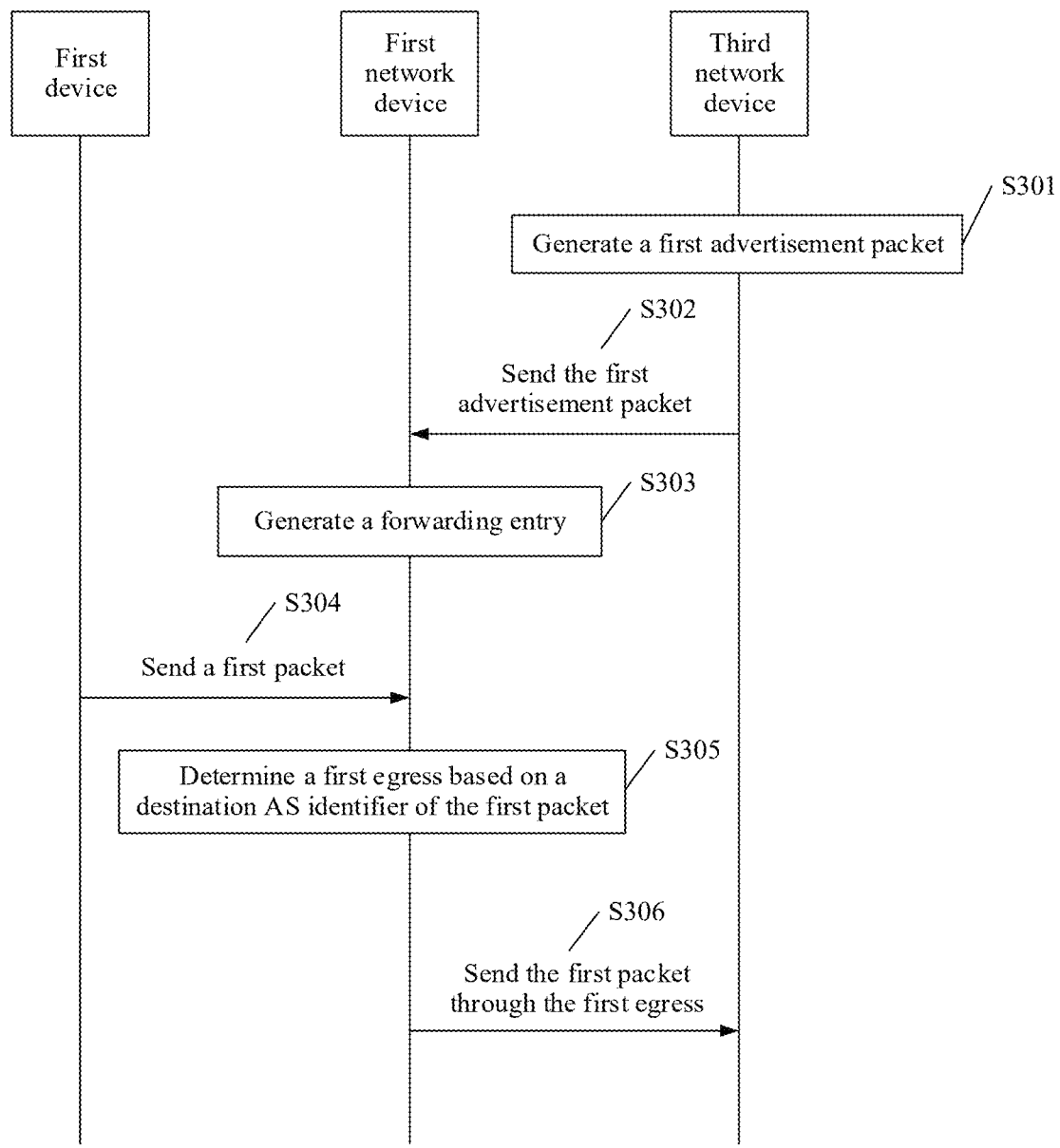
FIG. 3 is a diagram of signaling interaction of packet sending according to an embodiment of this application.

FIG. 3 is a diagram of signaling interaction of a method for sending a packet according to an embodiment of this application. The method for sending a packet provided in this embodiment of this application includes the following steps.

S301: A third network device generates a first advertisement packet.

In this embodiment of this application, the third network device may be any one of the network device 221, the network device 222, the network device 223, and the network device 224 in FIG. 2.

In this embodiment of this application, the first advertisement packet generated by the third network device includes a source AS identifier, and the source AS identifier is an AS identifier corresponding to a source device of the first advertisement packet. In this embodiment of this application, the third network device communicates with a downstream device. In this case, the AS identifier corresponding to the source device is an identifier of an AS corresponding to the downstream device, or an identifier of an AS to which the third network device belongs. For example, if the third network device is the network device 222 or the network device 223, the source device is the device 212, and the AS identifier corresponding to the source device is the AS 2.

S302: The third network device sends the first advertisement packet to a first network device.

In this embodiment of this application, the first network device may be any one of the network device 221, the network device 222, the network device 223, or the network device 224 in FIG. 2 that is different from the third network device. In other words, the first network device and the third network device may belong to a same AS, or may belong to different ASs.

When the first network device and the third network device belong to a same AS, the first advertisement packet may further include an identifier of the source device, where the identifier indicates a specific location of the source device in the autonomous system. The identifier of the source device is an identifier of the downstream device communicating with the third network device. The identifier of the source device may uniquely identify the source device. For example, the identifier is a sequence number or an IP address of the source device in the corresponding AS.

When the first network device and the third network device belong to different ASs, the first advertisement packet may not include an identifier of the source device. In other words, the inter-AS advertisement packet does not carry the identifier of the source device.

In some embodiments, a connection may be established between the first network device and the third network device by using respective link-local addresses (LLAs). In this case, the first advertisement packet may carry the source AS identifier in an unconventional IPV6 or IP version 4 (IPv4) address form, or carry the source AS identifier in an unconventional IPV6 or IPv4 address form and the identifier of the source device.

When a conventional BGP connection is established between the first network device and the third network device, the source AS identifier may be carried in the first advertisement packet in a form of an IPV6 address or an IPV4 address, to form a special IPV6 address or IPv4 address. Using the IPV6 address as an example, to distinguish the special IPv6 address from a normal IPv6 address, the special IPv6 address may include indication information 1, where the indication information 1 indicates that the IPV6 address further includes the source AS identifier. For example, it is assumed that the indication information is 09, and the AS identifier corresponding to the source device is 00000126. In this case, the special IPV6 address carried in the first advertisement packet may be 0900:0001:2600::/40. Alternatively, the special IPv6 address includes indication information 2, where the indication information 2 indicates that the IPV6 address further includes the source AS identifier and the identifier of the source device. For example, it is assumed that the indication information is 08, the AS identifier corresponding to the source device is 00000126, and the identifier of the source device is 002766. In this case, the IPV6 address carried in the first advertisement packet may be 0800:0001:2600:2766/128. It should be noted that values of the indication information 1 and the indication information 2 may be determined based on network segments planned by operators. For example, China Telecom is identified by 09, and China Mobile is identified by 08. A manner in which the special IPv4 address carries the source AS identifier or carries the source AS identifier and the identifier of the source device is similar to that of the IPV6 address, and details are not described herein again.

In this way, when the first network device receives two advertisement packets, and the two advertisement packets respectively include two different IP addresses, the first network device may correspondingly process the advertisement packets based on indication information of the IP addresses. For example, it is assumed that the first network device receives an advertisement packet A and an advertisement packet B, where the advertisement packet A includes a conventional IP address, and the advertisement packet B includes an IP address that carries the source AS identifier and indication information (the indication information 1 or the indication information 2). In this case, the first network device may determine, through detection, whether the advertisement packet A and the advertisement packet B include the indication information. Because the advertisement packet A does not include the indication information, the first network device may process the advertisement packet A in a conventional processing manner. Because the advertisement packet B includes the indication information, the first network device may process the advertisement packet B according to the method for generating an entry provided in this embodiment of this application. In this way, the first network device may be compatible with a network of a conventional IP address.

In this embodiment of this application, the first advertisement packet may be a BGP update message. The third network device sends the BGP update message to the first network device, so that the first network device generates a forwarding entry. Certainly, in this embodiment of this application, another advertisement packet may alternatively be a BGP update message.

In some possible implementations, the BGP update message may include an NLRI field. FIG. 4 is a schematic diagram of a possible format of an NLRI field. The NLRI field may include a length field and a prefix field. In an example, the length field occupies one octet, namely, 8 bits. A length of the prefix field is variable. The prefix field may include the source AS identifier in the first advertisement packet. Optionally, in some embodiments, the prefix field may include a first route prefix address, where the first route prefix address is the foregoing IP address. The first route prefix address may include the source AS identifier, or include the source AS identifier and the identifier of the source device.

In addition, in this embodiment of this application, the first advertisement packet may include an AS identifier set, so that the first network device verifies the first advertisement packet. The third network device or another network device that forwards the first advertisement packet may add an identifier of an AS to which the third network device or the other network device belongs to the AS identifier set in the first advertisement packet. The AS identifier set in the first advertisement packet includes at least one AS identifier corresponding to an AS path from the third network device to the first network device. The AS path is an AS that the first advertisement packet passes through from the third network device to the first network device. When two or more ASs are passed through from the third network device to the first network device, that is, the AS identifier set includes at least two AS identifiers, the at least two AS identifiers may be sorted based on a sequence of the ASs on the AS path.

Refer to FIG. 2. It is assumed that the network device 224 is the third network device, and the network device 222 is the first network device. In this case, the network device 224 may send the first advertisement packet to the network device 221, so that the network device 221 forwards the first advertisement packet to the network device 222. The AS identifier set in the first advertisement packet generated by the network device 224 may include an AS identifier AS 3 corresponding to the network device 224. After receiving the first advertisement packet sent by the network device 224, the network device 221 may add an AS identifier AS 1 corresponding to the network device 221 to the AS identifier set in the first advertisement packet. In this case, the AS identifier set in the first advertisement packet is the AS 3 and the AS 1. After receiving the first advertisement packet sent by the network device 221, the network device 222 may add an AS identifier AS 2 corresponding to the network device 222 to the AS identifier set in the first advertisement packet. In this case, the AS identifier set in the first advertisement packet is the AS 3, the AS 1, and the AS 2, indicating that the first advertisement packet is forwarded to the first network device through an AS path "the AS 3, the AS 1, and the AS 2". For the AS path, the source device is a network device corresponding to a $1^{st}$ AS identifier, that is, the third network device, namely, the foregoing network device 224.

Similar to the third network device, the first network device may also send another advertisement packet including the AS identifier corresponding to the first network device to the third network device or any one or more other network devices. The other advertisement packet may include the AS identifier corresponding to the first network device, that is, the identifier of the AS to which the first network device belongs, and is for notifying the other network devices of the AS identifier corresponding to the first network device.

S303: The first network device generates a forwarding entry.

In this embodiment of this application, the first network device may generate the forwarding entry based on the first advertisement packet and a first egress for receiving the first advertisement packet. The forwarding entry may also be referred to as a routing entry or any other name, and may include a destination AS identifier and an identifier of the first egress. The destination AS identifier is the source AS identifier in the first advertisement packet. In this embodiment of this application, the destination AS identifier is an AS identifier corresponding to the third network device.

The first network device may have at least one network interface. The first network device and another network device may transmit a packet to each other through the network interface. In this embodiment of this application, a network interface through which the first network device receives the first advertisement packet may be referred to as the first egress. The first egress or another network interface of the first network device may be a physical interface of the first network device, or may be a virtual interface corresponding to a virtual private network (VPN) identity (ID) or a tunnel ID.

After receiving the first advertisement packet through the first egress, the first network device may store, in the forwarding entry, a correspondence between the AS identifier (namely, the destination AS identifier) corresponding to the third network device and the identifier of the first egress. In this way, after receiving a first packet whose destination AS identifier is the AS identifier corresponding to the third network device, the first device may determine, based on the forwarding entry, the identifier of the first egress corresponding to the first packet, to determine the first egress for sending the first packet.

Still refer to FIG. 2. It is assumed that the first network device is the network device 221, and the third network device is the network device 222. In this case, the network device 222 may send the first advertisement packet to the network device 221. The source device of the first advertisement packet is the network device 222, and the source AS identifier is the AS identifier AS 2 corresponding to the network device 222.

It is assumed that the network device 221 may have a network interface A and a network interface B, and the network device 221 is connected to the network device 222 through the network interface A, and is connected to the network device 224 through the network interface B. In this case, the network device 221 may receive an advertisement packet from the network device 222 through the network interface A, and receive an advertisement packet from the network device 224 through the network interface B. In this case, the network device 221 may generate a forwarding entry shown in FIG. 5. The forwarding entry includes a correspondence between an identifier of the network interface A and the AS identifier AS 2 corresponding to the network device 222, and an identifier of the network interface B and the AS identifier AS 3 corresponding to the network device 224. Refer to a $1^{st}$ line in FIG. 5. It indicates that when receiving a data packet that needs to be sent to the AS 2, the network device 221 may send the data packet through an egress A. When the network device 221 is further connected to the network device 224 through the network interface B, the network device 221 may generate a forwarding entry including a correspondence between the identifier of the network interface B and the AS identifier AS 3 corresponding to the network device 224. Refer to a $2^{nd}$ line in FIG. 5. It indicates that when receiving a data packet that needs to be sent to the AS 3, the network device 221 may send the data packet through an egress B. The destination AS identifier in FIG. 5 may also be referred to as a destination address, a route prefix, or the like.

It should be noted that if the source AS identifier carried in the first advertisement packet is in an IP address form, the destination AS identifier in the generated forwarding entry may also be in the IP address form. For details about the IP format, refer to the foregoing descriptions. Details are not described herein again.

In this embodiment of this application, the forwarding entry records the correspondence between the identifier of the first egress and the AS identifier corresponding to the third network device. In an example, the first network device stores only the correspondence between the AS identifier corresponding to the network device that generates the first advertisement packet and the network interface for receiving the first advertisement packet. In this case, the forwarding entry of the first network device may store only correspondences between different AS identifiers and interfaces, and a quantity of forwarding entries is the same as a quantity of AS identifiers. Because one AS may include a plurality of network devices, and a quantity of ASs in a network architecture is far less than a quantity of network devices, it is clear that a quantity of forwarding entries of the first network device is less than the quantity of network devices, that is, less than a quantity of forwarding entries in a conventional technology. In this way, an amount of information recorded in the forwarding entry of the first network device is reduced, and a quantity of tables searched by the first network device when the first network device forwards a packet is also reduced, so that a pressure on the network device is reduced.

In some possible implementations, in addition to the correspondence between the AS identifier corresponding to the third network device and the identifier of the first egress, in this embodiment of this application, the forwarding entry may further store a next-hop network device corresponding to the first advertisement packet. The next-hop network device corresponding to the first advertisement packet may be a network device directly connected to the first network device through the first egress, in other words, a network device that directly sends the first advertisement packet to the first network device. For example, when the first network device is directly connected to the third network device through the first egress, the third network device may directly send the first advertisement packet to the first network device through the first egress. In this case, the next-hop network device corresponding to the first advertisement packet may be the third network device. If the first network device is not directly connected to the third network device, it is assumed that a network device may directly send the first advertisement packet to the first network device through the first egress. In this case, the next-hop device corresponding to the first advertisement packet is the network device. In this case, a forwarding entry of the network device 221 in FIG. 2 may be shown in FIG. 6. Refer to a $1^{st}$ line in FIG. 6. It indicates that when receiving a data packet that needs to be sent to the AS 2, the network device 221 may send the data packet to the network device 222 through an egress B. Refer to a $2^{nd}$ line in FIG. 6. It indicates that when receiving a data packet that needs to be sent to the AS 3, the network device 221 may send the data packet to the network device 224 through an egress B.

In some possible implementations, to facilitate packet forwarding inside an AS, if the AS identifier corresponding to the first network device is the same as the source AS identifier, the forwarding entry may further include an identifier of a destination device. The first network device may generate the forwarding entry based on the source AS identifier, the identifier of the first egress, and the identifier of the source device. For example, the first network device may use the source AS identifier included in the first advertisement packet as the destination AS identifier, use the identifier of the source device included in the first advertisement packet as the identifier of the destination device, and then store, as the forwarding entry, a correspondence between the destination AS identifier, the identifier of the destination device, and the identifier of the first egress for receiving the first advertisement packet. If an identifier of the network device 222 is a router 222, and the network device 223 is connected to the network device 222 through a network interface C, a forwarding entry of the network device 223 in FIG. 2 may be shown in FIG. 7. It indicates that when receiving a data packet that needs to be sent to the AS 2 and whose identifier of a destination device is the router 222, the network device 223 may send the data packet to the network device 222 through an egress C. In some possible implementations, the forwarding entry may further include a next-hop AS identifier and an AS path. The first network device may use a penultimate AS identifier on the AS path of the first advertisement packet as the next-hop AS identifier, and store the destination AS identifier, the next-hop AS identifier, the identifier of the first egress, and the AS path as the forwarding entry. It is assumed that the network device 224 in FIG. 2 is connected to the network device 221 through a network interface D. In this case, a forwarding entry generated by the network device 224 may be shown in FIG. 8. Refer to a $1^{st}$ line in FIG. 8. It indicates that when receiving a data packet that needs to be sent to the AS 1, the network device 224 may send the data packet through an egress D, and the data packet may directly reach the AS 1. Refer to a $2^{nd}$ line in FIG. 8. It indicates that when receiving a data packet that needs to be sent to the AS 2, the network device 224 may send the data packet through the egress D, and the data packet first passes through the AS 1 and then reaches the AS 2.

The foregoing describes a process in which the first network device generates the forwarding entry based on the first advertisement packet. In addition, in consideration of network security, before generating the forwarding entry, the first network device may further verify the first advertisement packet by using a plurality of verification methods based on the AS identifier set in the first advertisement packet. The verification method is described in detail below.

Path hijacking is a common network attack means. An attacker may tamper with a transmission path of a packet, to induce a network device that receives the packet to establish a connection to an unauthorized network device. To defend against a path hijacking attack, in some possible implementations, the first network device may generate the forwarding entry based on a neighbor relationship between ASs corresponding to any two adjacent AS identifiers in the AS identifier set and after verifying that the neighbor relationship is correct, or continue to perform another verification. There may be a neighbor relationship between any two ASs that are not directly connected through another AS.

In this embodiment of this application, the first network device may prestore a neighbor relationship between a plurality of ASs in a network architecture. After receiving the first advertisement packet, the first network device may determine whether there is a neighbor relationship between the ASs corresponding to any two adjacent AS identifiers in the AS identifier set in the first advertisement packet. Because the AS identifier set represents the AS path through which the first advertisement packet passes, theoretically, there is definitely a neighbor relationship between any two adjacent AS identifiers in the AS identifier set. Therefore, if the first network device finds that there is no neighbor relationship between the ASs corresponding to any two adjacent AS identifiers in the AS identifier set in the first advertisement packet, it indicates that the first advertisement packet is tampered with by an attacker in a transmission process, and the first network device may discard the first advertisement packet. The first device may generate the forwarding entry after determining that the neighbor relationship between any two adjacent AS identifiers in the AS identifier set is correct, to effectively defend against the path hijacking attack.

In addition, source hijacking is also a common attack means. An attacker may tamper with an AS identifier corresponding to a source device of an advertisement packet, namely, an AS identifier of a network device that generates the advertisement packet. As a result, a network device that receives the advertisement packet establishes a connection to an unauthorized network device. To defend against a source hijacking attack, in some possible implementations, the first network device may further determine whether a $1^{st}$ AS identifier in the AS identifier set in the first advertisement packet is the same as the AS identifier corresponding to the third network device. When sending the first advertisement packet, the network device may add an AS identifier corresponding to the network device to the AS identifier set in the first advertisement packet. Therefore, the $1^{st}$ AS identifier in the AS identifier set is the AS identifier corresponding to the network device that first sends the first advertisement packet, namely, the AS identifier corresponding to the source device. In this way, by determining whether the source AS identifier in the first advertisement packet is consistent with the $1^{st}$ AS identifier in the AS identifier set, the first network device may determine whether the source AS identifier in the first advertisement packet is modified. If the $1^{st}$ AS identifier in the AS identifier set is the same as the AS identifier corresponding to the source device of the first advertisement packet, it indicates that the AS identifier that is recorded in the first advertisement packet and that corresponds to the network device generating the first advertisement packet is consistent with an AS identifier recorded in the AS identifier set, and it indicates that the AS identifier of the source device of the first advertisement packet is not tampered with. If the $1^{st}$ AS identifier in the AS identifier set is different from the AS corresponding to the third network device, it indicates that the AS identifier that is recorded in the first advertisement packet and that corresponds to the network device generating the first advertisement packet is different from an AS identifier recorded in the AS identifier set, and it indicates that the AS identifier of the source device of the first advertisement packet has been tampered with, and the first network device may discard the first advertisement packet. The first network device may generate the forwarding entry after determining that the neighbor relationship between any two adjacent AS identifiers in the AS identifier set is correct, to effectively defend against the source hijacking attack.

FIG. 9 is a schematic diagram of a structure of a network architecture according to an embodiment of this application. In the figure, the BGP network architecture may include a network device 901, a network device 902, a network device 903, a network device 904, a network device 905, and a network device 906. Different network devices may belong to different ASs, and respectively correspond to different AS identifiers. In this embodiment of this application, an AS identifier corresponding to the network device 901 is an AS 1, an AS identifier corresponding to the network device 902 is an AS 2, an AS identifier corresponding to the network device 903 is an AS 3, an AS identifier corresponding to the network device 904 is an AS 4, an AS identifier corresponding to the network device 905 is an AS 5, and an AS identifier corresponding to the network device 906 is an AS 6.

In this embodiment of this application, the network device 901 may be connected to the network device 902 and the network device 904, the network device 903 may be connected to the network device 902, the network device 905 may be connected to the network device 906, and the network device 905 is not connected to the network device 903. In this case, the AS 1 is in a neighbor relationship with the AS 2 and the AS 4, the AS 3 is in a neighbor relationship with the AS 2, the AS 5 is in a neighbor relationship with the AS 4 and the AS 6, and the AS 3 is not in a neighbor relationship with the AS 5.

The network device 903 may generate an advertisement packet A, and send the advertisement packet A to the network device 901 through the network device 902. The network device 906 may generate an advertisement packet B, and send the advertisement packet B to the network device 901 through the network device 904 and the network device 905. If the advertisement packet A and the advertisement packet B are not tampered with by an attacker in a transmission process, when the advertisement packet A and the advertisement packet B are received by the network device 901, an AS identifier set included in the advertisement packet A is "AS 3 AS 2", and an AS identifier set included in the advertisement packet B is "AS 6 AS 5 AS 4".

If an attacker attacks the network device 901 through path hijacking, for example, the attacker may intercept the advertisement packet B sent by the network device 904 to the network device 901, and change the AS identifier set in the advertisement packet B to "AS 4 AS 5 AS 3", after receiving the advertisement packet B, the network device 901 may verify a neighbor relationship between any two AS identifiers in the AS identifier set in the advertisement packet B, that is, verify a neighbor relationship between the AS 4 and the AS 5 and a neighbor relationship between the AS 5 and the AS 3. Because there is no neighbor relationship between the AS 5 and the AS 3, it indicates that no connection is established between any network device in an AS corresponding to the AS 3 and any network device in an AS corresponding to the AS 3. In this case, it is clear that the advertisement packet B cannot directly enter, from the AS in which the network device 903 is located, the autonomous system in which the network device 905 is located. Therefore, the network device 901 may determine that the attacker tampers with the advertisement packet B, and therefore discard the advertisement packet B.

If an attacker attacks the network device 901 through source hijacking, for example, the attacker may intercept the advertisement packet A sent by the network device 902 to the network device 901, and change an AS identifier corresponding to a source device of the advertisement packet A from the AS 3 to the AS 5, after receiving the advertisement packet A, the network device 901 may determine, through comparison, whether the AS identifier corresponding to the source device of the advertisement packet A is the same as a $1^{st}$ AS identifier set in the AS identifier set. Because the $1^{st}$ AS identifier AS 3 in the AS identifier set is different from the AS identifier AS 5 corresponding to the tampered source device, the network device 901 may determine that the attacker tampers with the advertisement packet A, and therefore discard the advertisement packet A.

In addition, if the destination AS identifier in the forwarding entry is in an IP address form, the first network device may further determine, by comparing a mask length corresponding to the route prefix address with a mask length corresponding to the destination AS identifier in the forwarding entry, whether the first network device is under a long mask hijacking attack. The route prefix address may include a mask and an address. The mask is also referred to as a subnet mask, and indicates a subnet in which a host in the address is located.

When determining a route, a network device may perform selection through longest mask matching. The network device may select, as a longest match route, a route with a longest mask from a plurality of received routes, to generate a forwarding entry. For example, it is assumed that the network device receives an advertisement packet whose route prefix is 192.168.20.16/28 through a network interface A, and receives an advertisement packet whose route prefix is 192.168.0.0/16 through a network interface B. In this case, the network device may add a correspondence between the route prefix 192.168.20.16/28 and the network interface A and a correspondence between the route prefix 192.168.0.0/16 and the network interface B to the forwarding entry.

When the network device receives a data packet whose destination address is 192.168.20.1, the network device searches the forwarding entry for a network interface that matches the route prefix. Because both 192.168.20.16/28 and 192.168.0.0/16 match the routing prefix 192.168.20.1, the network device may select a network interface corresponding to a routing prefix with a longer mask to forward the data packet. Because a mask length of the routing prefix 192.168.20.16/28 is 28 bits, and a mask length of the routing prefix 192.168.0.0/16 is 16 bits, the network device may select the network interface A corresponding to the routing prefix 192.168.20.16/28 with the longer mask, to send the data packet to another network device through the network interface A.

Long mask hijacking is based on the principle of longest mask matching. For a conventional solution in which an advertisement packet received by a network device carries an IP address of a destination device, an attacker may combine an IP address of an unauthorized device and a long mask into a false route prefix address and send the route prefix address to the network device. Therefore, when selecting a route prefix address, the network device selects the fake route prefix address, and consequently send a packet to the unauthorized network device.

However, in this embodiment of this application, if the destination AS identifier in the forwarding entry is in an IP address form, after receiving any advertisement packet, the first network device may determine, through comparison, whether a mask length corresponding to a route prefix of the advertisement packet is greater than the mask length of the destination AS identifier in the forwarding entry, and discard the advertisement packet when the mask length corresponding to the route prefix of the advertisement packet is greater than the mask length of the destination AS identifier. For example, it is assumed that an attacker forges the third advertisement packet and sends the third advertisement packet to the first network device. The third advertisement packet may include a route prefix address, and the route prefix address may include the destination AS identifier in the forwarding entry and a long mask. In this case, the first network device may discard the third advertisement packet in response to that a mask length corresponding to the route prefix address in the third advertisement packet is greater than the mask length corresponding to the destination AS identifier in the forwarding entry.

By step S303, the first network device completes establishment of the forwarding entry.

In an example, if the first advertisement packet passes the verification, the first network device may advertise a route to another network device by using a second advertisement packet.

For example, the first network device adds the AS identifier corresponding to the first network device to an end of the AS identifier set in the first advertisement packet, to obtain the second advertisement packet. Optionally, the first network device may alternatively change an identifier of a next hop in the first advertisement packet to an identifier of the first network device, to obtain the second advertisement packet. Alternatively, the first network device selects an optimal route based on information in the forwarding entry, to generate the second advertisement packet. A source AS identifier in the second advertisement packet is the source AS identifier in the first advertisement packet, and an end of an AS identifier set in the second advertisement packet is the AS identifier corresponding to the first network device. An identifier of an AS to which a second network device belongs is different from the AS identifier in the AS identifier set in the first advertisement packet. In other words, the first network device may send the second advertisement packet to another AS that is not on the AS path of the first advertisement packet, to diffuse the AS identifier of the third network device to a network device in the other AS in the network architecture.

It should be noted that if an LLA connection is established between the third network device and the first network device, but a conventional BGP connection is established between the first network device and the second network device, and the source AS identifier in the first advertisement packet is represented in a conventional IP address format, the destination AS identifier in the forwarding entry generated by the first network device may be in the conventional IP address format. In addition, the source AS identifier in the second advertisement packet sent by the first network device to the second network device needs to be converted into the conventional address format, so that the second network device can generate a corresponding forwarding entry based on the source AS identifier in the IP address format, to forward the packet between the network devices in different connection manners.

The foregoing describes the method for generating a forwarding entry, and the following describes a method that is for sending a packet and that is provided in an embodiment of this application.

S304: The first device sends a first packet to the first network device.

In this embodiment of this application, the first device may be a terminal device, and the first device may communicate with the first network device. Therefore, after generating the first packet, the first device may send the first packet to the first network device, so that the first network device forwards the first packet to a destination device of the first packet.

The first packet may include a destination address, indicating a location of the destination device of the first packet in a network. The destination address of the first packet may include a destination AS identifier, namely, an AS identifier corresponding to the destination device of the first packet, indicating a location, in the network, of an AS in which the destination device of the first packet is located. In addition, the destination address of the first packet may further include an identifier of the destination device, indicating a specific location of the destination device in a destination AS. In this embodiment of this application, the destination device of the first packet may be a downstream device of the third network device. In an example, the destination device of the first packet and the third network device belong to same domain. The destination AS identifier of the first packet is an AS identifier corresponding to the downstream device, and is also equivalent to the AS identifier corresponding to the third network device. The following uses an example in which the destination device is the downstream device of the third network device for description.

Before sending the first packet, the first device may first determine to first obtain the destination address of the destination device. In an example, the first device may send a first request to a first server, and determine the destination address by receiving a first response from the first server. The first server may be a Domain Name System (DNS) server or another server. The destination address may include the destination AS identifier and the identifier of the destination device. In this embodiment of this application, when the destination device is the third network device, the destination AS identifier is the AS identifier corresponding to the third network device, and the identifier of the destination device is an identifier of the third network device.

When the first device needs to access the destination device, the first device may send the first request to the first server. In this embodiment of this application, the first device or a gateway device connected to the first device may parse a to-be-accessed network address, to obtain a DNS corresponding to the destination device, and send the DNS corresponding to the destination device to the first server by using the first request.

After receiving the first request sent by the first device, the first server may query, based on the DNS included in the first request, the destination AS identifier corresponding to the DNS, namely, the identifier of the AS corresponding to the destination device. The first server may send, to the first device, the first response including the destination AS identifier.

Still using FIG. 2 as an example, assuming that the terminal device 211 wants to access the server 213, the terminal device 211 may first obtain a DNS of the server 213, and send, to the first server (which is not shown in the figure), a first request including the DNS of the server 213. The first server may search, based on the DNS of the server 213, for an address corresponding to the server 213. In an example, the address includes an AS identifier corresponding to the destination device and a device identifier of the destination device. The address corresponding to the server 213 is sent to the terminal device 211 by using a first response. In this way, the terminal device 211 may send a first packet to the destination address, namely, the server 213.

The identifier of the destination device indicates network location information of the destination device in the AS. For example, if the destination device is a terminal device, the identifier of the destination device may be any one or more of a media access control (MAC) address of the destination device or another device string identifier or digital identifier that can represent the destination device. In this way, the destination address of the first packet not only includes the identifier of the AS corresponding to the destination device, but also includes the identifier of the destination device. In this case, the first network device may forward the first packet to the destination device based on the destination address.

In this embodiment of this application, the first packet may further include a source address field. The source address field may include the AS identifier of the source device and a second identifier of the first device, and indicates an address of the first device that sends the first packet. In this way, after receiving the first packet, the destination device may send a data packet or another packet to the first device based on the AS identifier of the source device and the second identifier of the first device.

Because this application provides a new technical solution based on AS routing, before sending the first packet, the first device may further first obtain address information of the first device. The address information may include the AS identifier of the source device and the second identifier of the first device. In an example, the first device may send a second request to a second device, to obtain the address information of the first device. The second request may include a first identifier of the first device. The first device may receive a second response from the second device, and determine the address of the first device based on the second response. The first identifier carried in the second request sent by the first device may be an identifier indicating identity information of the first device, such as a device ID of the first device. The AS identifier of the source device may be an identifier of an AS corresponding to the first device, and is for representing the AS in which the first device is located. The second identifier of the first device may be for representing the identity information of the first device. The AS identifier of the source device and the second identifier of the first device are combined as a source address of the first packet, and indicate location information of the first device in the network architecture.

In this embodiment of this application, the second device may be a server, or may be another network device in the network architecture. The first device may send the second request to the second device. After receiving the second request, the second device may generate the second response based on the first identifier of the first device included in the second request, and send the second response to the first device. The second response may include the AS identifier of the source device and the second identifier of the first device.

To prevent an attacker from determining the network address of the first device by using the first packet, in this embodiment of this application, the second device may randomly set the AS identifier of the source device or the second identifier of the first device. Because the network address of the first device may include the AS identifier corresponding to the first device and the second identifier of the first device, that the second device randomly allocates the AS identifier of the source device and the second identifier to the first device is equivalent to that the second device randomly allocates a network address to the first device. In this way, because the network address of the first device is randomly allocated when the first device sends a packet, the attacker cannot determine the network address of the first device when the first device does not send a packet to another network device, and naturally cannot attack the first device by using the network address.

In some possible implementations, the first device may first send the first request and then send the second request. Certainly, the first device may alternatively first send the first request and then send the second request. This is not limited in this embodiment of this application.

S305: The first network device determines the first egress based on the destination AS identifier included in the first packet.

After receiving the first packet, the first network device may determine the first egress based on the destination AS identifier included in the first packet, that is, determine the first egress based on the AS identifier corresponding to the third network device, to send the first packet to the destination device through the first egress.

In this embodiment of this application, the first network device may determine the first egress based on the forwarding entry. Before determining the first egress based on the destination AS identifier, the first network device may first determine whether the destination AS identifier is consistent with the AS identifier corresponding to the first network device. In response to two cases in which the destination AS identifier is the same as or different from the AS identifier corresponding to the first network device, the first network device may determine the first egress according to two methods. The following separately describes the two cases.

Case 1: If the destination AS identifier is different from the AS identifier corresponding to the first network device, it indicates that the destination device of the first packet and the first network device respectively belong to different ASs. In this case, the first network device needs to first forward the first packet to the AS in which the destination device of the first packet is located. Therefore, in response to that the destination AS identifier is different from the AS identifier corresponding to the first network device, the first network device may search the forwarding entry for the identifier of the first egress corresponding to the destination AS identifier, and send the first packet to the destination device of the first packet through the first egress. In other words, the first network device searches the forwarding entry for the identifier of the first egress corresponding to the AS identifier corresponding to the third network device, and sends the first packet to the third network device through the first egress.

The forwarding entry is generated by the first network device based on the first advertisement packet, and records a correspondence between the first egress for receiving the first advertisement packet and the AS identifier corresponding to the third network device. In other words, the first network device may receive, through the first egress, a packet from an autonomous system corresponding to the AS identifier corresponding to the third network device, or send a packet to any network device in the autonomous system corresponding to the AS identifier corresponding to the third network device. In this case, when the first network device receives a packet whose destination AS identifier is the AS identifier corresponding to the third network device, the first network device may search the forwarding entry for the identifier of the network interface corresponding to the destination AS identifier, that is, determine, based on the AS identifier corresponding to the third network device, the identifier of the first egress corresponding to the AS identifier, and send the first packet through the first egress. That the first network device may receive the first advertisement packet through the first egress indicates that the first network device and the third network device may transmit information with each other through the first egress. In this case, the first network device may naturally send the packet to the third network device through the first egress. In this way, it can be ensured that the first packet can be sent to the destination device through a correct path.

Still refer to FIG. 2. The terminal device 211 may serve as the first device to generate the first packet, and send the first packet to the network device 221 that serves as the first network device. In this embodiment of this application, the destination device of the first packet may be a downstream device of the network device 224, for example, the terminal device 213. In this case, the destination AS identifier in the first packet is the AS identifier AS 3 corresponding to the network device 224.

It is assumed that the forwarding entry of the network device 221 is shown in FIG. 5. In this case, after the network device 221 receives the first packet from the terminal device 211, the network device 221 may determine whether the destination AS identifier included in the first packet is the same as the AS identifier AS 1 corresponding to the network device 221. In response to that the destination AS identifier AS 2 is different from the AS 1, the network device 221 may determine, based on the forwarding entry, the identifier of the first egress corresponding to AS 2. It can be learned based on the 1$^{st}$ row of the forwarding entry shown in FIG. 5 that the first egress corresponding to the AS 2 is the network interface A. In this case, the network device 221 may determine that the first egress for sending the first packet is the network interface A.

Case 2: If the destination AS identifier is the same as the AS identifier corresponding to the first network device, it indicates that the destination device of the first packet and the first network device belong to a same AS. In this case, the first network device needs to determine only a specific location of the destination device in the AS. Therefore, in response to that the destination AS identifier is the same as the AS identifier corresponding to the first network device, the first network device may search the forwarding entry for the identifier of the first egress corresponding to the identifier of the destination device, and send the first packet to the destination device of the first packet through the first egress. In other words, the first network device searches the forwarding entry for the identifier of the first egress corresponding to the identifier of the third network device, and sends the first packet to the third network device through the first egress.

In this embodiment of this application, the forwarding entry may include a correspondence between the destination address and the identifier of the first egress, In an example, a correspondence between the destination AS identifier and the identifier of the first egress and a correspondence between the identifier of the destination device and the first egress. In this case, in response to that the destination AS identifier is the same as the AS identifier corresponding to the first network device, the first network device may search the forwarding entry for the identifier of the corresponding first egress based on the identifier of the destination device. In other words, the first network device searches the forwarding entry for the identifier of the first egress corresponding to the identifier of the third network device, and sends the first packet through the first egress.

Still refer to FIG. 2. The terminal device 212 may serve as the first device to generate the first packet, and send the first packet to the network device 223 that serves as the first network device. In this embodiment of this application, the destination device of the first packet may be a downstream device of the network device 222. In this case, the network device 223 may send the first packet to the network device 222, so that the network device 222 sends the first packet to the destination device of the first packet.

It is assumed that the forwarding entry of the network device 223 is shown in FIG. 7. In this case, after the network device 223 receives the first packet from the terminal device 212, the network device 223 may determine, based on whether the destination AS identifier AS 2 included in the first packet is the same as the AS identifier AS 2 corresponding to the network device 223, the egress for sending the first packet. In response to that the destination AS identifier is the same as the AS 1, the network device 222 may determine, based on the forwarding entry, the identifier of the first egress corresponding to the router 222. It can be learned based on the forwarding entry shown in FIG. 7 that the first egress corresponding to the router 222 is the network interface B, and the network device may determine that the first egress for sending the first packet is the network interface B.

S311: The first network device sends the first packet through the first egress.

After determining the first egress corresponding to the first packet, the first network device may send the first packet through the first egress. In this way, the third network device can receive the first packet, to ensure that the destination device of the first packet can receive the first packet, so that packet transmission is completed.

Correspondingly, refer to FIG. 10. An embodiment of this application further provides an apparatus 1000 for generating an entry. The apparatus 1000 is used in a network device, and the network device may serve as the first network device to perform steps related to entry generation in the embodiment shown in FIG. 3. The apparatus 1000 includes a receiving unit 1001 and a processing unit 1002. The receiving unit 1001 may be configured to receive a first advertisement packet, and the processing unit 1002 may be configured to perform step S303 in the embodiment shown in FIG. 3.

For example, the receiving unit 1001 is configured to receive the first advertisement and the source AS identifier is an AS identifier corresponding to a source device of the first advertisement packet. The processing unit 1002 is configured to generate a forwarding entry based on the source AS identifier, where the forwarding entry includes a destination AS identifier and an identifier of a first egress, the destination AS identifier is the source AS identifier, and the first network device receives the first advertisement packet through the first egress.

For other content of the apparatus 1000 for generating an entry, refer to the foregoing descriptions. Details are not described herein again.

Figure 11:
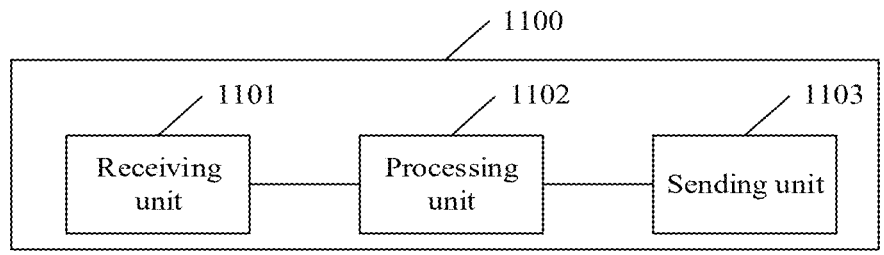
FIG. 11 is a schematic diagram of a structure of a packet sending apparatus according to an embodiment of this application.

Refer to FIG. 11. An embodiment of this application further provides an apparatus 1100 for sending a packet. The apparatus 1100 is used in a network device, and the network device may serve as the first network device to perform steps related to packet sending in the embodiment shown in FIG. 3. The apparatus 1100 includes a receiving unit 1101, a processing unit 1102, and a sending unit 1103. The receiving unit 1101 may receive a first packet sent by a first device. The processing unit 1102 may be configured to perform step S305 in the embodiment shown in FIG. 3. The sending unit 1103 may be configured to perform step S306 in the embodiment shown in FIG. 3.

For example, the receiving unit 1101 is configured to obtain the first packet, where a destination address of the first packet includes a destination autonomous system AS identifier, and the destination AS identifier is an AS identifier corresponding to a destination device of the first packet. The processing unit 1102 is configured to determine a first egress based on the destination AS identifier. The sending unit 1103 is configured to send the first packet to the destination device through the first egress.

For other content of the apparatus 1100 for sending a packet, refer to the foregoing descriptions. Details are not described herein again.

Figure 12:
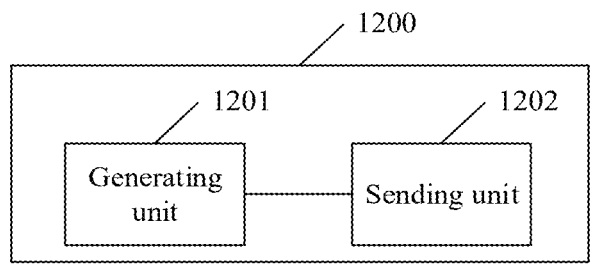
FIG. 12 is a schematic diagram of a structure of a packet sending apparatus according to an embodiment of this application.

Refer to FIG. 12. An embodiment of this application further provides an apparatus 1200 for sending a packet. The apparatus 1200 is used in a network device, and the network device may serve as the third network device to perform related steps in the embodiment shown in FIG. 3. The apparatus 1200 includes a generating unit 1201 and a sending unit 1202. The generating unit 1201 may be configured to perform step S301 in the embodiment shown in FIG. 3, and the sending unit 1202 may be configured to perform step S302 in the embodiment shown in FIG. 3.

For example, the generating unit 1201 is configured to generate a first advertisement and the source AS identifier is an AS identifier corresponding to the apparatus. The sending unit 1202 is configured to send the first advertisement packet to a first network device.

For other content of the apparatus 1200 for sending a packet, refer to the foregoing descriptions. Details are not described herein again.

Figure 13:
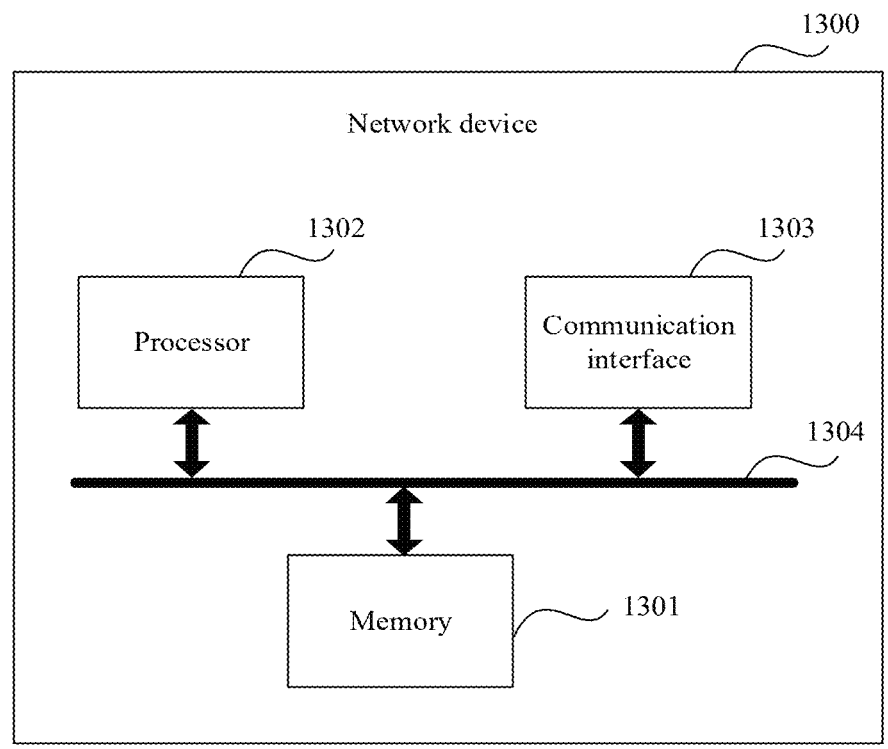
FIG. 13 is a schematic diagram of a structure of a network device according to an embodiment of this application.

Refer to FIG. 13. An embodiment of this application further provides a network device 1300. The network device 1300 includes at least one processor 1302 and at least one communication interface 1303. Further, the network device may include at least one memory 1301. The memory 1301 is configured to store a computer program or instructions. The memory 1301 may be a memory inside the processor, or may be a memory outside the processor. A function of the apparatus 1000 may be implemented on the network device 1300. When the embodiment shown in FIG. 10 is implemented and the units described in the embodiment of FIG. 10 are implemented by using software, software or program code required for performing functions of the receiving unit 1001 and the processing unit 1002 in FIG. 10 is stored in the memory 1301. A function of the apparatus 1100 may be implemented on the network device 1300. When the embodiment shown in FIG. 11 is implemented and the units described in the embodiment in FIG. 11 are implemented by software, software or program code required for performing functions of the receiving unit 1101, the processing unit 1102, and the sending unit 1103 in FIG. 11 is stored in the memory 1301. The processor 1302 is configured to execute the instructions in the memory 1301, to enable the network device 1300 to perform any one or more of step S303, step S305, or step S306 applied to the embodiment shown in FIG. 3. The communication interface 1303 is configured to communicate with another network device or the first device.

The memory 1301, the processor 1302, and the communication interface 1303 are connected to each other through a bus 1304. The bus 1304 may be a Peripheral Component Interconnect (PCI) bus, an Extended Industry Standard Architecture (EISA) bus, or the like. Buses may be classified into an address bus, a data bus, a control bus, and the like. For case of representation, only one thick line is for representing the bus in FIG. 13, but this does not mean that there is only one bus or only one type of bus.

In an embodiment, the processor 1302 may be configured to receive a first advertisement packet, where the first advertisement packet includes a source autonomous system AS identifier, and the source AS identifier is an AS identifier corresponding to a source device of the first advertisement packet, and generate a forwarding entry based on the source AS identifier in the first advertisement packet, where the forwarding entry includes a destination AS identifier and an identifier of a first egress, the destination AS identifier is the source AS identifier, and the first network device receives the first advertisement packet through the first egress. For a detailed processing process of the processor 1302, refer to detailed descriptions in step S303 in the embodiment shown in FIG. 3. Details are not described herein again.

In an embodiment, the processor 1302 may alternatively be configured to obtain a first packet, where a destination address of the first packet includes a destination autonomous system AS identifier, and the destination AS identifier is an AS identifier corresponding to a destination device of the first packet, determine a first egress based on the destination AS identifier, and send the first packet to the destination device through the first egress. For a detailed processing process of the processor 1302, refer to detailed descriptions of step S305 and step S306 in the embodiment shown in FIG. 3. Details are not described herein again.

The communication interface 1303 is configured to interact with the first device or another network device. For an example process, refer to detailed descriptions of the embodiment shown in FIG. 3. Details are not described herein again.

The memory 1301 may be a random-access memory (RAM), a flash, a read-only memory (ROM), an erasable programmable ROM (EPROM), an electrically EPROM (EEPROM), a register, a hard disk, a removable hard disk, a compact disc (CD) ROM (CD-ROM), or any other form of storage medium known to a person skilled in the art.

The processor 1302 may be, for example, a central processing unit (CPU), a general-purpose processor, a digital signal processor (DSP), an application-specific integrated circuit (ASIC), a field-programmable gate array (FPGA) or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor.

The communication interface 1303 may be, for example, an interface card, or may be an Ethernet interface or an Asynchronous Transfer Mode (ATM) interface.

Figure 14:
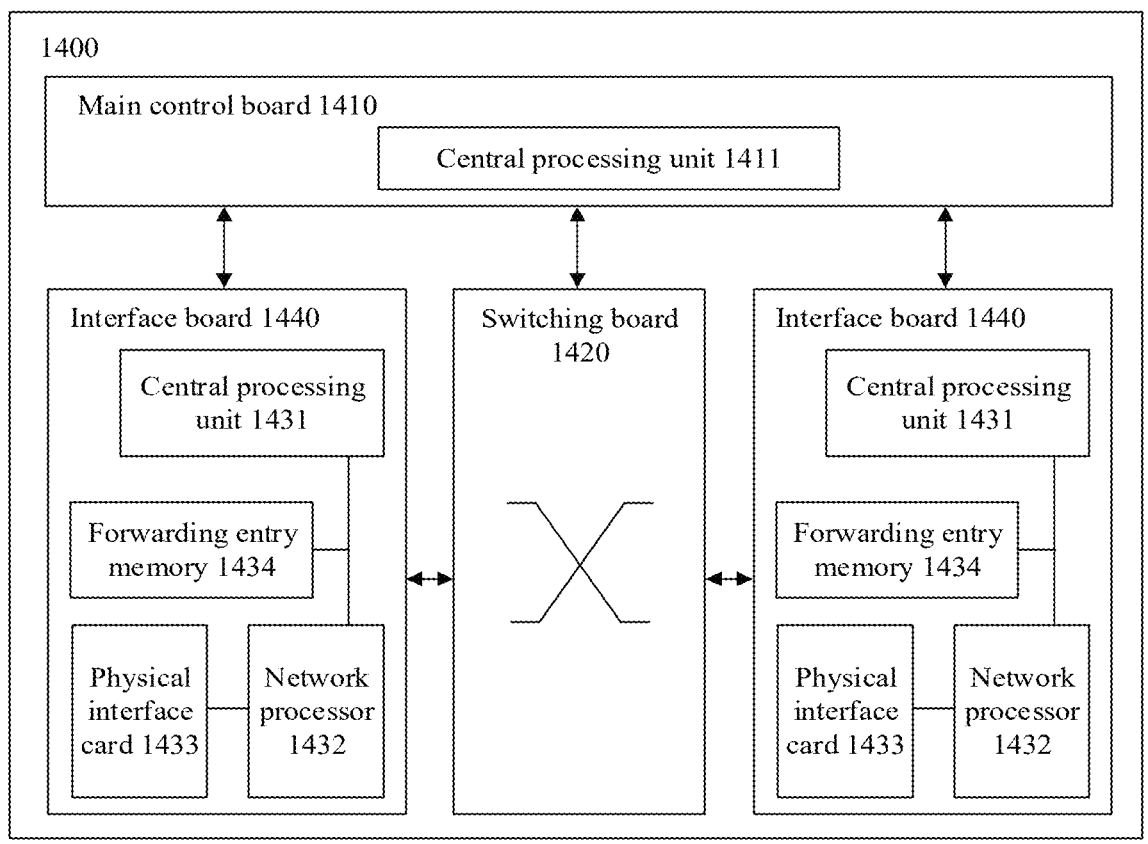
FIG. 14 is a schematic diagram of a structure of a network device according to an embodiment of this application.

FIG. 14 is a schematic diagram of a structure of a network device 1400 according to an embodiment of this application. The network device shown in the embodiment in FIG. 3 may be implemented by using the device shown in FIG. 14. Refer to the schematic diagram of the structure of the device shown in FIG. 14. The device 1400 includes a main control board and one or more interface boards. The main control board and the interface boards are communicatively connected. The main control board is also referred to as a main processing unit (MPU) or a route processor card. The main control board is responsible for controlling and managing each component in the device 900, including route computation, device management, and function maintenance. The interface board is also referred to as a line processing unit (LPU) or a line card, and is configured to forward data. In some embodiments, the device 1400 may also include a switching board. The switching board is communicatively connected to the main control board and the interface boards. The switching board is configured to forward data between the interface boards. The switching board may also be referred to as a switch fabric unit (SFU). The interface board includes a CPU, a memory, a forwarding chip, and a physical interface card (PIC). The central processing unit is communicatively connected to the memory, a network processor, and the physical interface card. The memory is configured to store a forwarding table. The forwarding chip is configured to forward a received data packet based on the forwarding table stored in the memory. If a destination address of the data packet is an address of the device 1400, the data packet is sent to the CPU, for example, a central processing unit 1431, for processing. If the destination address of the data packet is not the address of the device 1400, a next hop and an outbound interface that correspond to the destination address are found in the forwarding table based on the destination address, and the data packet is forwarded to the outbound interface corresponding to the destination address. The forwarding chip may be a network processor (NP). The PIC, also referred to as a subcard, can be installed on the interface board. The PIC is responsible for converting an optical or electrical signal to a data packet, checking validity of the data packet, and forwarding the data packet to the forwarding chip for processing. In some embodiments, the central processing unit may also perform a function of the forwarding chip, for example, implement software forwarding based on a general-purpose CPU, so that the interface board does not need the forwarding chip. A communication connection between the main control board, the interface board, and the switching board may be implemented through a bus. In some embodiments, the forwarding chip may be implemented by using an ASIC or an FPGA.

Logically, the device 1400 includes a control plane and a forwarding plane. The control plane includes the main control board and the central processing unit. The forwarding plane includes components for performing forwarding, such as the memory, the PIC, and the NP. The control plane performs functions such as a function of a router, generating the forwarding table, processing signaling and protocol packets, and configuring and maintaining a status of a device. The control plane delivers the generated forwarding table to the forwarding plane. On the forwarding plane, the NP searches a table based on the forwarding table delivered by the control plane, to forward a packet received by the PIC of the device 1400. The forwarding table delivered by the control plane may be stored in the memory. In some embodiments, the control plane and the forwarding plane may be totally separated, and are not on a same device. The following briefly describes the foregoing process with reference to the embodiment in FIG. 3.

As shown in the method in FIG. 3, the network device may receive a first advertisement packet or a first packet by using the physical interface card 1433, and send the first advertisement packet or the first packet to the CPU 1431 for processing. The CPU 1431 may generate a forwarding entry based on the first advertisement packet, or determine a first egress based on the first packet, to send the first packet to a destination device of the first packet through the first egress.

Figure 15:
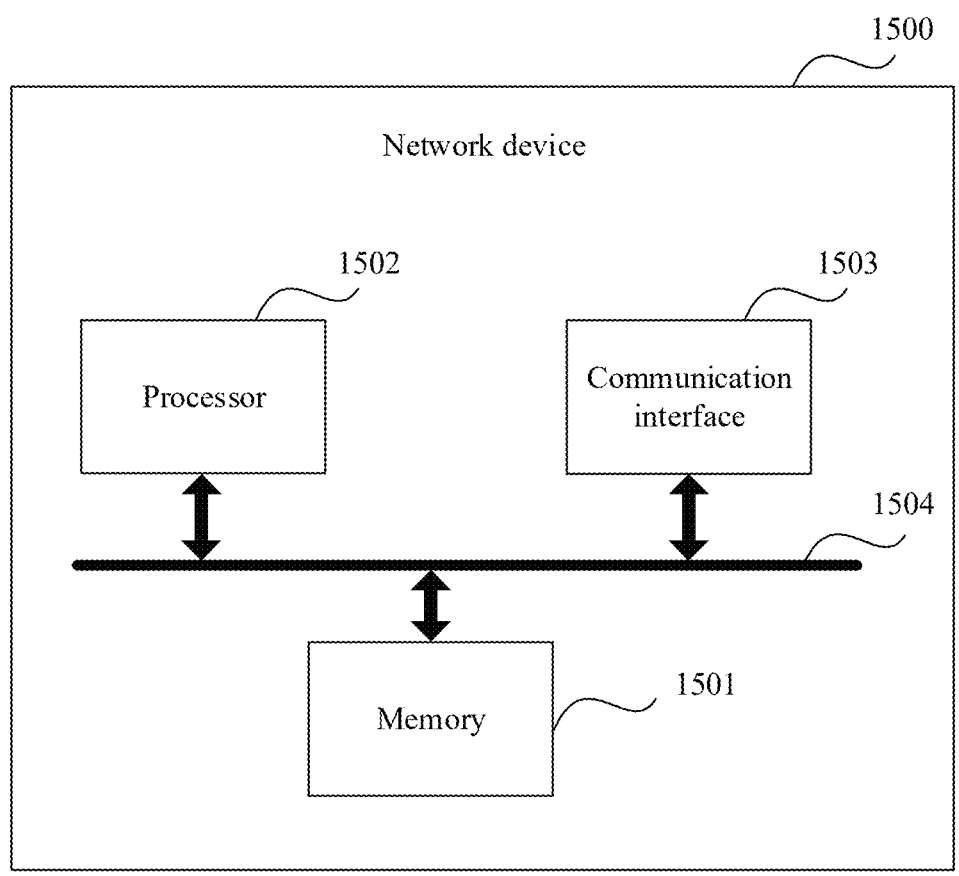
FIG. 15 is a schematic diagram of a structure of a network device according to an embodiment of this application.

The network device provided in this embodiment of the present disclosure may correspond to the first network device in the method embodiment in FIG. 3, and may implement functions of the network device and/or various steps and methods implemented by the network device in the foregoing method embodiments. The foregoing is merely a brief example description. For brevity, details are not described herein again. Refer to FIG. 15. An embodiment of this application further provides a network device 1500. The network device 1500 includes at least one processor 1502 and at least one communication interface 1503. Further, the network device may include at least one memory 1501. The memory 1501 is configured to store a computer program or instructions. The memory 1501 may be a memory inside the processor, or may be a memory outside the processor. When the embodiment shown in FIG. 12 is implemented and the units described in the embodiment of FIG. 12 are implemented by using software, software or program code required for performing functions of the generating unit 1201 and the sending unit 1202 in FIG. 12 is stored in the memory 1501. The processor 1502 is configured to execute the instructions in the memory 1501, to enable the network device 1500 to perform step S301 and step S302 in the embodiment shown in FIG. 3. The communication interface 1503 is configured to communicate with another network device.

The memory 1501, the processor 1502, and the communication interface 1503 are connected to each other through a bus 1504. The bus 1504 may be a PCI bus, an EISA bus, or the like. Buses may be classified into an address bus, a data bus, a control bus, and the like. For case of representation, only one thick line is for representing the bus in FIG. 15, but this does not mean that there is only one bus or only one type of bus.

In an embodiment, the processor 1502 may be configured to generate a first advertisement packet, where the first advertisement packet includes a source autonomous system AS identifier, and the source AS identifier is an AS identifier corresponding to the apparatus, and send the first advertisement packet to a first network device. For a detailed processing process of the processor 1502, refer to detailed descriptions of step S301 and step S302 in the embodiment shown in FIG. 3. Details are not described herein again.

The communication interface 1503 is configured to interact with a first network device or another network device. For an example process, refer to detailed descriptions of the embodiment shown in FIG. 3. Details are not described herein again.

The memory 1501 may be a RAM, a flash, a ROM, an EPROM, an EEPROM, a register, a hard disk, a removable hard disk, a CD-ROM, or any other form of storage medium known to a person skilled in the art.

The processor 1502 may be, for example, a CPU, a general-purpose processor, a DSP, an ASIC, an FPGA or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor.

The communication interface 1503 may be, for example, an interface card, or may be an Ethernet interface or an ATM interface.

Figure 16:
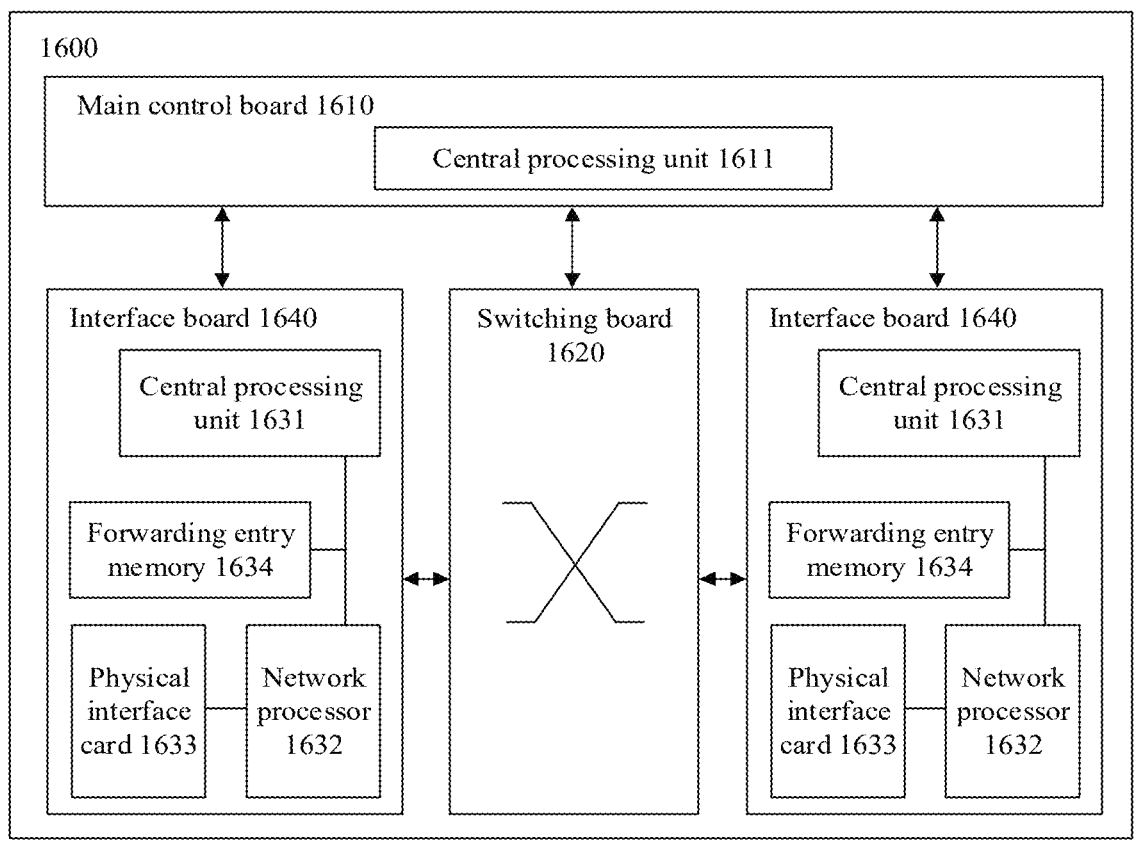
FIG. 16 is a schematic diagram of a structure of a network device according to an embodiment of this application.

FIG. 16 is a schematic diagram of a structure of a network device 1600 according to an embodiment of this application. The third network device shown in the embodiment in FIG. 3 may be implemented by using the device shown in FIG. 16. Refer to the schematic diagram of the structure of the device shown in FIG. 16. The device 1600 includes a main control board and one or more interface boards. The main control board and the interface boards are communicatively connected. The main control board is also referred to as an MPU or a route processor card. The main control board is responsible for controlling and managing each component in the device 900, including route computation, device management, and function maintenance. The interface board is also referred to as an LPU or a line card, and is configured to forward data. In some embodiments, the device 1600 may also include a switching board. The switching board is communicatively connected to the main control board and the interface boards. The switching board is configured to forward data between the interface boards. The switching board may also be referred to as an SFU. The interface board includes a central processing unit, a memory, a forwarding chip, and a PIC. The central processing unit is communicatively connected to the memory, a network processor, and the physical interface card. The memory is configured to store a forwarding table. The forwarding chip is configured to forward a received data packet based on the forwarding table stored in the memory. If a destination address of the data packet is an address of the device 1600, the data packet is sent to the CPU, for example, a central processing unit 1631, for processing. If the destination address of the data packet is not the address of the device 1600, a next hop and an outbound interface that correspond to the destination address are found in the forwarding table based on the destination address, and the data packet is forwarded to the outbound interface corresponding to the destination address. The forwarding chip may be an NP. The PIC, also referred to as a subcard, can be installed on the interface board. The PIC is responsible for converting an optical or electrical signal to a data packet, checking validity of the data packet, and forwarding the data packet to the forwarding chip for processing. In some embodiments, the central processing unit may also perform a function of the forwarding chip, for example, implement software forwarding based on a general-purpose CPU, so that the interface board does not need the forwarding chip. A communication connection between the main control board, the interface board, and the switching board may be implemented through a bus. In some embodiments, the forwarding chip may be implemented by using an ASIC or an FPGA.

Logically, the device 1600 includes a control plane and a forwarding plane. The control plane includes the main control board and the central processing unit. The forwarding plane includes components for performing forwarding, such as the memory, the PIC, and the NP. The control plane performs functions such as a function of a router, generating the forwarding table, processing signaling and protocol packets, and configuring and maintaining a status of a device. The control plane delivers the generated forwarding table to the forwarding plane. On the forwarding plane, the NP searches a table based on the forwarding table delivered by the control plane, to forward a packet received by the PIC of the device 1600. The forwarding table delivered by the control plane may be stored in the memory. In some embodiments, the control plane and the forwarding plane may be totally separated, and are not on a same device. The following briefly describes the foregoing process with reference to the embodiment in FIG. 3.

As shown in the method described in FIG. 3, the network device may generate a first advertisement packet by using the CPU 1631, where the first advertisement packet may include a source AS identifier, namely, an AS identifier corresponding to the device 1600. The CPU 1631 may send the first advertisement packet to a first network device by using the physical interface card 1633, so that the first network device generates a forwarding entry based on the first advertisement packet.

The network device provided in this embodiment of the present disclosure may correspond to the third network device in the method embodiment in FIG. 3, and may implement functions of the network device and/or various steps and methods implemented by the network device in the foregoing method embodiments. The foregoing is merely a brief example description. For brevity, details are not described herein again.

It should be noted that, there may be one or more main control boards. When there is a plurality of main control boards, the main control boards may include a primary main control board and a secondary main control board. There may be one or more interface boards, and a network device having a stronger data processing capability provides more interface boards. There may also be one or more physical interface cards on the interface board. There may be no switching board or one or more switching boards. When there is a plurality of switching boards, load balancing and redundancy backup may be implemented together. In a centralized forwarding architecture, the network device may not need the switching board, and the interface board provides a function of processing service data of an entire system. In a distributed forwarding architecture, the network device may have at least one switching board, and data exchange between a plurality of interface boards is implemented by using the switching board, to provide a large-capacity data exchange and processing capability. Therefore, a data access and processing capability of the network device in the distributed architecture is better than that of the device in the centralized architecture. Optionally, the network device may alternatively be in a form in which there is only one card. In an example, there is no switching board, and functions of the interface board and the main control board are integrated on the card. In this case, the central processing unit on the interface board and the central processing unit on the main control board may be combined into one central processing unit on the card, to perform functions obtained by combining the two central processing units. The device in this form (for example, a network device such as a low-end switch or router) has a weak data exchange and processing capability. A specific architecture that is to be used depends on a specific networking deployment scenario. This is not limited herein.

In addition, an embodiment of this application further provides a computer-readable storage medium, including a computer program. When the computer program is run on a computer, the computer is enabled to perform the foregoing method for generating an entry or the method for sending a packet that are applied to the network device 1400, or the computer is enabled to perform the foregoing method for sending a packet applied to the network device 1600.

An embodiment of this application further provides a chip system, including a processor, where the processor is coupled to a memory. The memory is configured to store a program or instructions. When the program or the instructions is/are executed by the processor, the chip system is enabled to implement the method in any one of the foregoing method embodiments.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be separate from the processor. This is not limited in this application. For example, the memory may be a non-transitory processor, for example, a ROM. The memory and the processor may be integrated into a same chip, or may be separately disposed on different chips. A type of the memory and a manner of disposing the memory and the processor are not limited in this application.

For example, the chip system may be an FPGA, an ASIC, a system on a chip (SoC), a CPU, an NP, a digital signal processor (DSP), a microcontroller unit (MCU), a programmable logic device (PLD), or another integrated chip.

It should be understood that steps in the foregoing method embodiments may be implemented by using a hardware integrated logic circuit or instructions in a software form in the processor. The steps of the methods disclosed with reference to embodiments of this application may be directly performed by a hardware processor, or may be performed by a combination of hardware in the processor and a software module.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that embodiments of the present disclosure described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

In this application, "at least one item (piece)" means one or more, and "a plurality of" means two or more. At least one of the following items (pieces) or a similar expression thereof refers to any combination of these items, including any combination of singular items (pieces) or plural items (pieces). For example, at least one item (piece) of a, b, or c may represent: a, b, c, a and b, a and c, b and c, or a, b, and c, where a, b, and c may be singular or plural. In this application, it is considered that "A and/or B" includes only A, only B, and A and B.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed systems, apparatuses, and methods may be implemented in another manner. For example, the described apparatus embodiments are merely examples. For example, unit division is merely logical module division, and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be obtained according to actual requirements to achieve the objectives of the solutions of embodiments.

In addition, module units in embodiments of this application may be integrated into one processing unit. Alternatively, each of the units may exist alone physically, or at least two units are integrated into one unit. The integrated unit may be implemented in a form of hardware, or may be implemented in a form of a software module unit.

When the integrated unit is implemented in the form of a software module unit and sold or used as an independent product, the integrated unit may be stored in a computer-readable storage medium. Based on such an understanding, the technical solutions may be implemented in the form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, such as a Universal Serial Bus (USB) flash drive, a removable hard disk, a ROM, a RAM, a magnetic disk, or an optical disc.

A person skilled in the art should be aware that in the foregoing one or more examples, functions described in the present disclosure may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communications medium, where the communications medium includes any medium that enables a computer program to be transmitted from one place to another. The storage medium may be any available medium accessible to a general-purpose or a dedicated computer.

The objectives, technical solutions, and beneficial effects of the present disclosure are further described in detail in the foregoing implementations. It should be understood that the foregoing descriptions are merely implementations of the present disclosure.

In conclusion, the foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A first network device comprising:
a receiver configured to receive a first advertisement packet through a first egress, wherein the first advertisement packet comprises a source autonomous system (AS) identifier and an AS identifier set, wherein the source AS identifier identifies a source device of the first advertisement packet, and wherein the AS identifier set comprises at least one AS identifier identifying an AS path from the source device to the first network device; and
a processor coupled to the receiver and configured to:
generate a forwarding entry comprising the source AS identifier and a first identifier of the first egress; and
send a second advertisement packet to a second network device, wherein the second advertisement packet comprises an AS identifier corresponding to the first network device and the AS identifier set, wherein a second AS corresponding to the second network device and a first AS corresponding to the first network device are neighboring ASs, and wherein the second AS is not on the AS path.

2. The first network device of claim 1, wherein the first advertisement packet further comprises a second identifier of the source device, wherein the processor is further configured to further generate the forwarding entry based on the second identifier, and wherein the forwarding entry further comprises the second identifier.

3. The first network device of claim 1, wherein the at least one AS identifier comprises at least two AS identifiers, and wherein the processor is further configured to determine that a neighbor relationship between two adjacent AS identifiers in the at least two AS identifiers is correct.

4. The first network device of claim 1, wherein the processor is further configured to determine that a first AS identifier in the AS identifier set is the same as the source AS identifier, and wherein the first AS identifier identifies an AS corresponding to the source device on the AS path.

5. The first network device of claim 1, wherein the receiver is further configured to receive a third advertisement packet, wherein the third advertisement packet comprises a route prefix address, wherein the route prefix address comprises the source AS identifier, and wherein the processor is further configured to discard the third advertisement packet in response to a first mask length corresponding to the route prefix address being greater than a second mask length corresponding to the source AS identifier.

6. The first network device of claim 1, wherein the first advertisement packet is a Border Gateway Protocol (BGP) update message.

7. The first network device of claim 6, wherein the source AS identifier is carried in a route prefix field of the BGP update message.

8. The first network device of claim 1, wherein the first advertisement packet comprises an Internet Protocol version 6 (IPv6) address, wherein the IPV6 address comprises indication information and the source AS identifier, and wherein the indication information indicates that the IPV6 address further comprises the source AS identifier.

9. A first network device comprising:
a receiver configured to obtain a first packet comprising a destination address, wherein the destination address comprises a destination autonomous system (AS) identifier, and wherein the destination AS identifier identifies a destination device of the first packet;
a processor coupled to the receiver and configured to:
determine a first egress based on the destination AS identifier;
identify that the destination AS identifier is different from an AS identifier corresponding to the first network device; and
determine the first egress based on a forwarding entry in response to identifying that the destination AS identifier is different from the AS identifier, and wherein the forwarding entry comprises the destination AS identifier and a first identifier of the first egress; and
a transmitter coupled to the processor and configured to send the first packet to the destination device through the first egress.

10. The first network device of claim 9, wherein the receiver is further configured to receive a first advertisement packet through the first egress, wherein the first advertisement packet comprises the destination AS identifier, and wherein the processor is further configured to generate the forwarding entry based on the destination AS identifier and the first identifier in response to identifying that the destination AS identifier is different from the AS identifier.

11. The first network device of claim 9, wherein the forwarding entry further comprises a route prefix address, and wherein the route prefix address comprises the destination AS identifier.

12. The first network device of claim 10, wherein the first advertisement packet further comprises a second identifier of a source device, wherein the processor is further configured to further generate the forwarding entry based on the second identifier, and wherein the forwarding entry further comprises the second identifier.

13. The first network device of claim 10, wherein the first advertisement packet further comprises a source autonomous system (AS) identifier that identifies a source device of the first advertisement packet.

14. A first network device comprising:
a receiver configured to obtain a first packet comprising a destination address, wherein the destination address comprises a destination autonomous system (AS) identifier and a first identifier of a destination device, and wherein the destination AS identifier identifies the destination device of the first packet;
a processor coupled to the receiver and configured to:
determine a first egress based on the destination AS identifier;
identify that the destination AS identifier is the same as an AS identifier corresponding to the first network device; and
determine, in response to identifying that the destination AS identifier is the same as the AS identifier and based on a forwarding entry, the first egress corresponding to the first identifier, wherein the forwarding entry comprises the first identifier and a second identifier of the first egress; and
a transmitter coupled to the processor and configured to send the first packet to the destination device through the first egress.

15. The first network device of 23, wherein the receiver is further configured to receive a first advertisement packet through the first egress, wherein the first advertisement packet comprises the destination AS identifier, and wherein the processor is further configured to generate the forwarding entry based on the destination AS identifier and the first identifier in response to identifying that the destination AS identifier is different from the AS identifier.

16. The first network device of claim 15, wherein the first advertisement packet further comprises a third identifier of a source device, wherein the processor is further configured to further generate the forwarding entry based on the third identifier, and wherein the forwarding entry further comprises the third identifier.

17. The first network device of claim 15, wherein the first advertisement packet further comprises a source autonomous system (AS) identifier that identifies a source device of the first advertisement packet.

18. The first network device of claim 17, wherein the first advertisement packet comprises an Internet Protocol version 6 (IPv6) address, wherein the IPv6 address comprises indication information and the source AS identifier, and wherein the indication information indicates that the IPv6 address further comprises the source AS identifier.

19. The first network device of claim 14, wherein the forwarding entry further comprises a route prefix address, and wherein the route prefix address comprises the destination AS identifier.

20. The first network device of claim 15, wherein the receiver is further configured to receive a second advertisement packet, wherein the second advertisement packet comprises a route prefix address, wherein the route prefix address comprises the source AS identifier, and wherein the processor is further configured to discard the second advertisement packet in response to a first mask length corresponding to the route prefix address being greater than a second mask length corresponding to the source AS identifier.

* * * * *

UNITED STATES PATENT AND TRADEMARK OFFICE
CERTIFICATE OF CORRECTION

PATENT NO. : 12,489,706 B2  
APPLICATION NO. : 18/148549  
DATED : December 2, 2025  
INVENTOR(S) : Haibo Wang, Shunwan Zhuang and Gang Yan Page 1 of 1

It is certified that error appears in the above-identified patent and that said Letters Patent is hereby corrected as shown below:

In the Claims

Claim 15, Column 34, Line 27: "device of 23, wherein" should read "device of 14, wherein"

Signed and Sealed this  
Thirteenth Day of January, 2026

John A. Squires  
*Director of the United States Patent and Trademark Office*